(12) United States Patent
Hancock

(10) Patent No.: US 12,361,245 B2
(45) Date of Patent: Jul. 15, 2025

(54) SYSTEMS AND METHODS FOR VOICE ACTIVATION OF QR AND OTHER SCANNABLE CODES

(71) Applicant: WGRS Licensing Company, LLC, Newport Beach, CA (US)

(72) Inventor: S. Lee Hancock, Corona del Mar, CA (US)

(73) Assignee: WGRS Licensing Company, LLC, Newport Beach, CA (US)

(*) Notice: Subject to any disclaimer, the term of this patent is extended or adjusted under 35 U.S.C. 154(b) by 0 days.

(21) Appl. No.: 18/427,664

(22) Filed: Jan. 30, 2024

(65) Prior Publication Data

US 2024/0354530 A1    Oct. 24, 2024

Related U.S. Application Data

(63) Continuation of application No. PCT/US2022/038983, filed on Jul. 31, 2022.

(60) Provisional application No. 63/228,078, filed on Jul. 31, 2021.

(51) Int. Cl.
*G06K 7/14*       (2006.01)
*H04W 4/02*       (2018.01)

(52) U.S. Cl.
CPC ............ *G06K 7/1417* (2013.01); *H04W 4/02* (2013.01)

(58) Field of Classification Search
CPC ............................. G06K 7/1417; H04W 4/02
See application file for complete search history.

(56) References Cited

U.S. PATENT DOCUMENTS

| | | | | |
|---|---|---|---|---|
| 2014/0032328 | A1* | 1/2014 | Greenfield | G06Q 30/0267 705/14.64 |
| 2014/0223283 | A1* | 8/2014 | Hancock | G06F 40/14 726/4 |
| 2019/0377783 | A1* | 12/2019 | Hancock | H04L 67/02 |
| 2020/0410809 | A1* | 12/2020 | Gotlieb | G06Q 50/34 |
| 2021/0133748 | A1* | 5/2021 | Li | G06Q 20/085 |
| 2021/0279776 | A1* | 9/2021 | Boerner | G06K 19/06037 |
| 2024/0135765 | A1* | 4/2024 | Lopes | G07C 9/27 |

* cited by examiner

*Primary Examiner* — Tuyen K Vo
(74) *Attorney, Agent, or Firm* — William A. English; Vista IP Law Group LLP

(57) ABSTRACT

Systems and methods are provided for voice activation of QR codes and other scannable codes with shortcode identifiers ("CIDs"). CIDs are created, geographically registered, owned, controlled, displayed, and used for human to human, human to machine, and machine to machine input, communications, QR and other scannable code activations, searches and other uses. CIDs may be created, curated and deployed in both on-blockchain and off-blockchain systems with non-fungible tokens and other similar identification and entification methodologies. CIDs may be displayed physically or virtually, and may be used over any text or voice service and with virtual reality, augmented reality and other smart glasses, headsets, etc.

19 Claims, 33 Drawing Sheets

Using Voice to more easily identify and select Multiple Codes on the same page or sign.

Examples from the Promotional Material (at right)
"Hey Siri, open 731"
"Hey Siri, directions to 2114"
"Hey Siri, hours of 2114".

Examples of Voice Devices with alternating CIDs and MLNNs

Speaker and Voice Device
with Clock and SID/LID Display

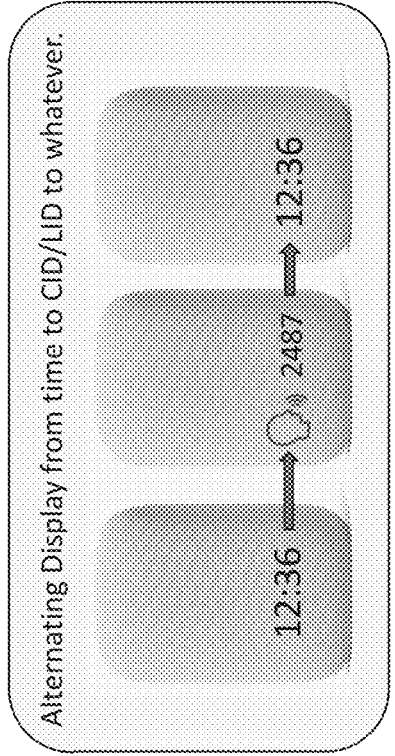

Alternating Display from time to CID/LID to whatever.

Example of CID on Amazon Echo and other voice interface Devices.
CID display can be static or digital, programmable remotely, or a derivative of the UUID or MAC address for the Device, encrypted. It can be an LiD to reflect the exact location/room in a 2D or 3D reference based the micro-location of the Device, encrypted or not. The CiD enables any users to identify the exact Device or location using the CiD, enabling a host of additional services related to the specific location of Device.

FIG. 8A

Online Scannable Codes and CIDs
Fig. 11

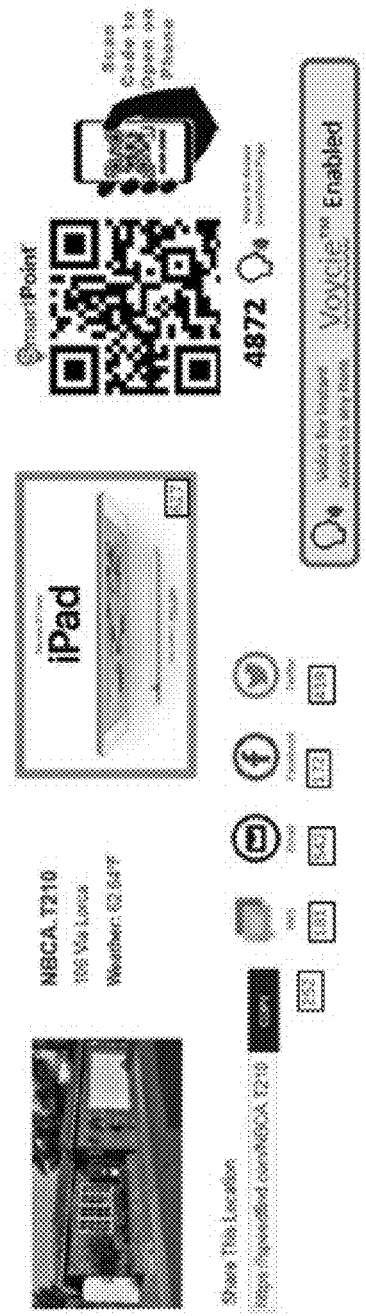
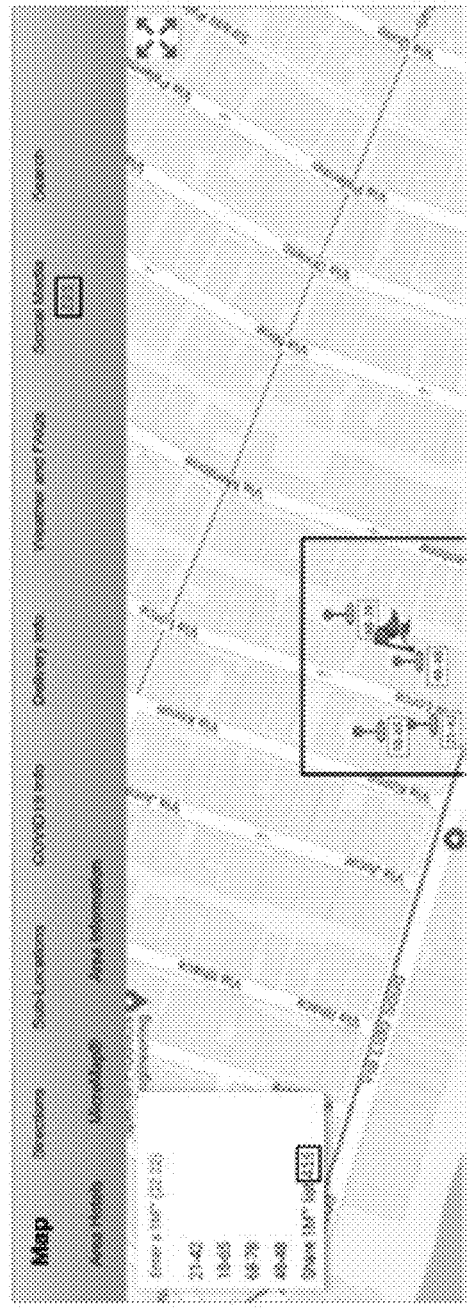
Fig. 12

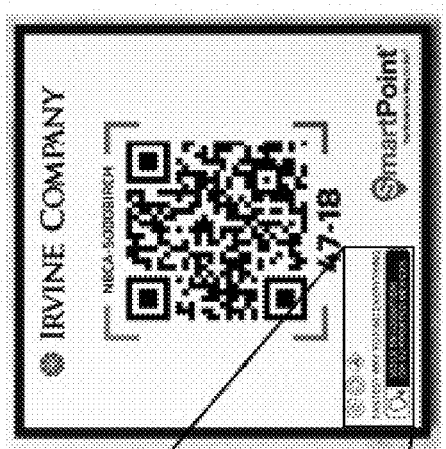
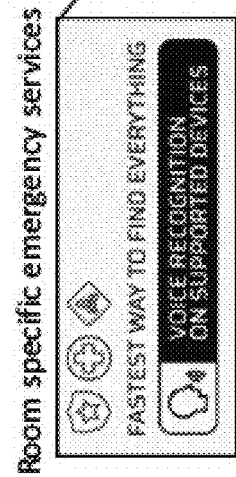
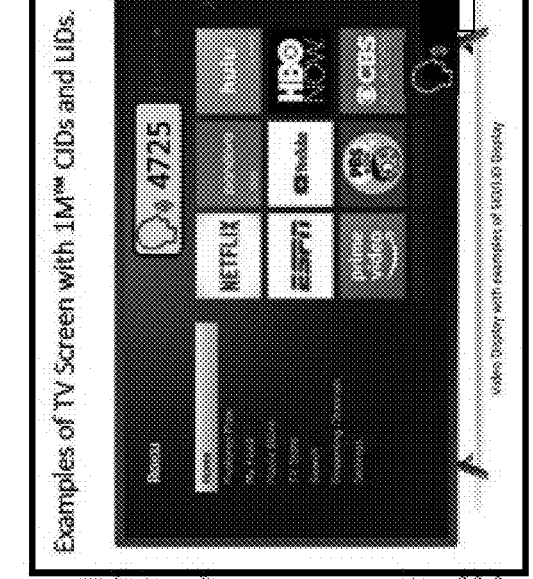
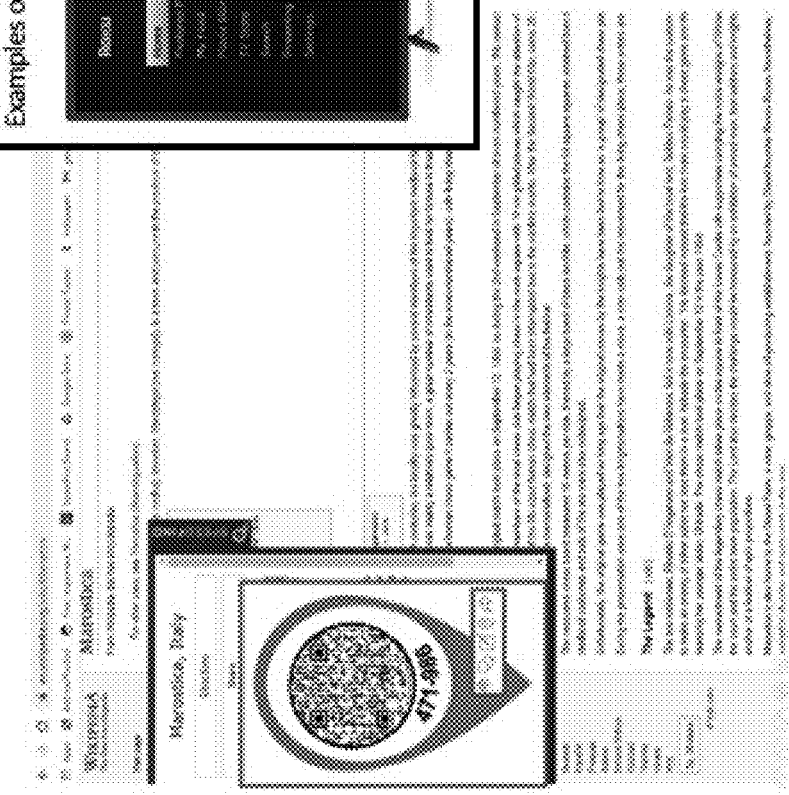
Fig. 13

Fig. 15 Using CIDs, LIDs, and MLNN Locators with Smart Glasses, AR, AV, Game, Heads up and Other Displays Examples of CIDs, MLNNss and other locators for exit signs and routes.
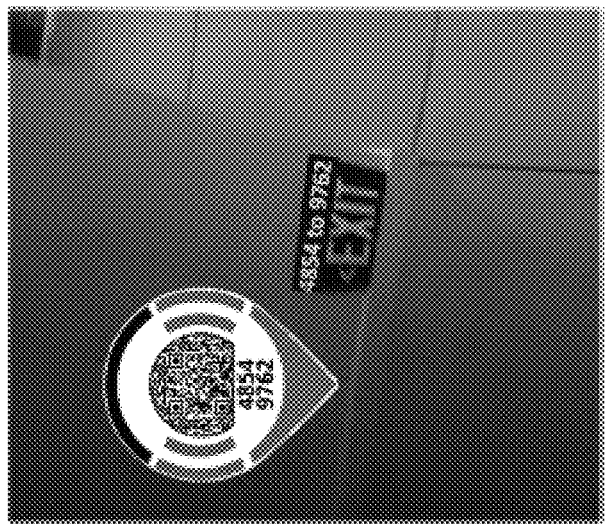
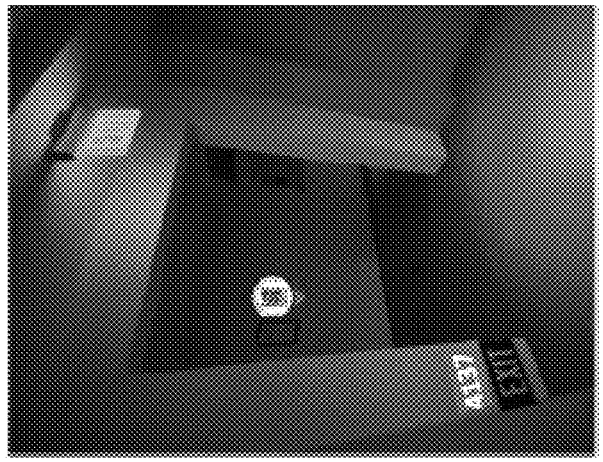
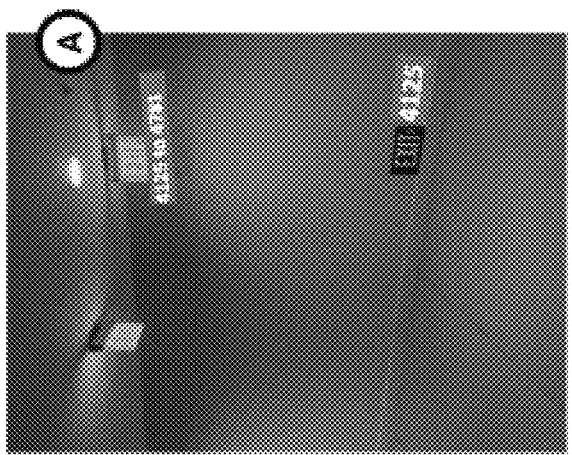
Fig. 16

Examples of CIDs and MLNNs with RideStop pickup and dropoff locations

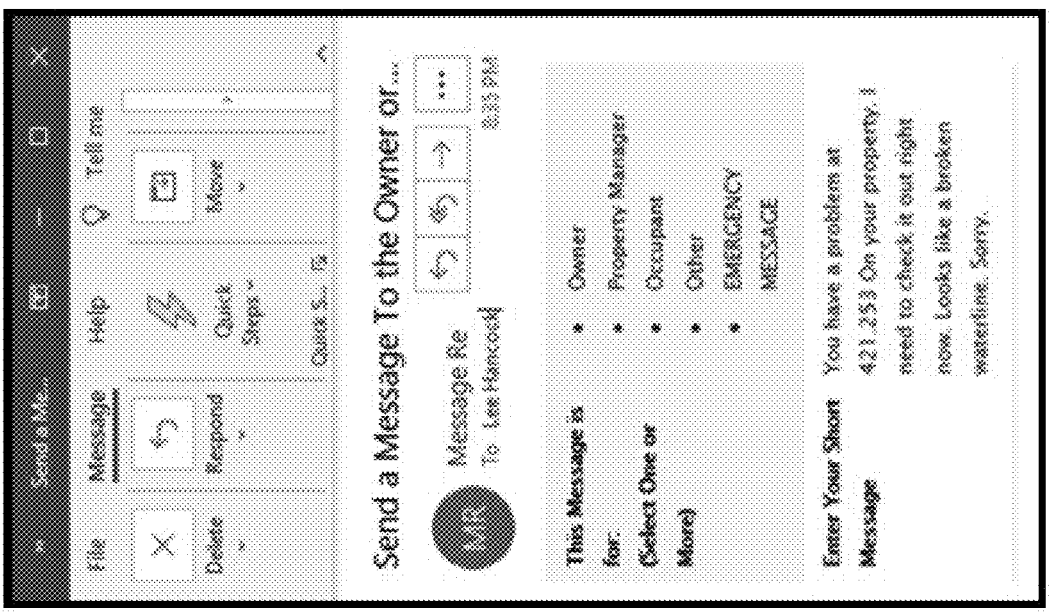
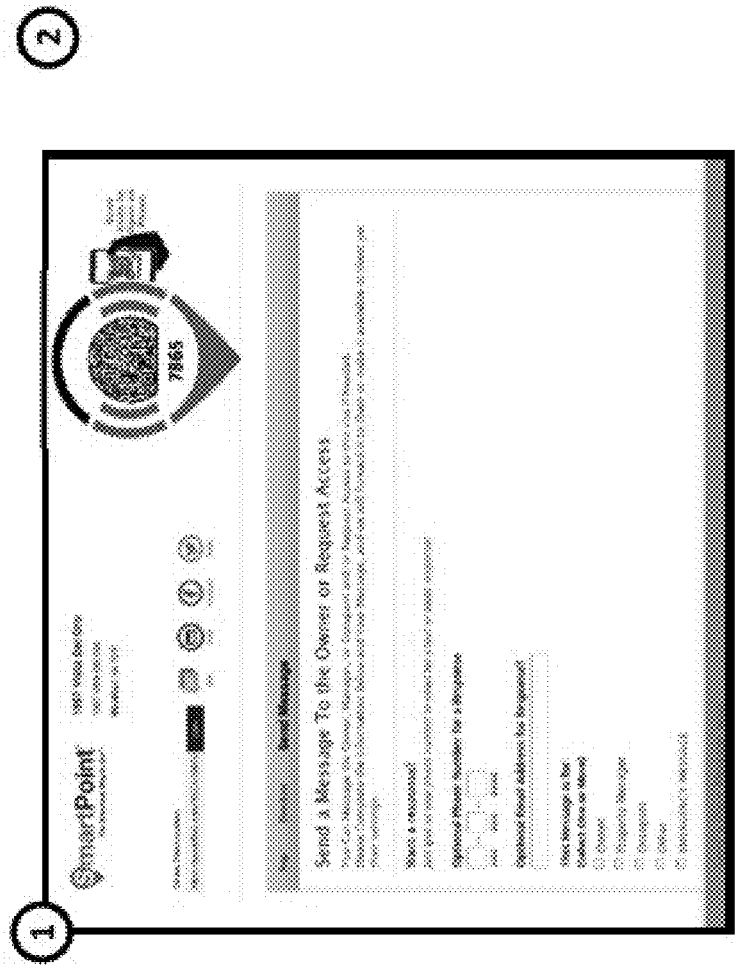
Fig. 21A

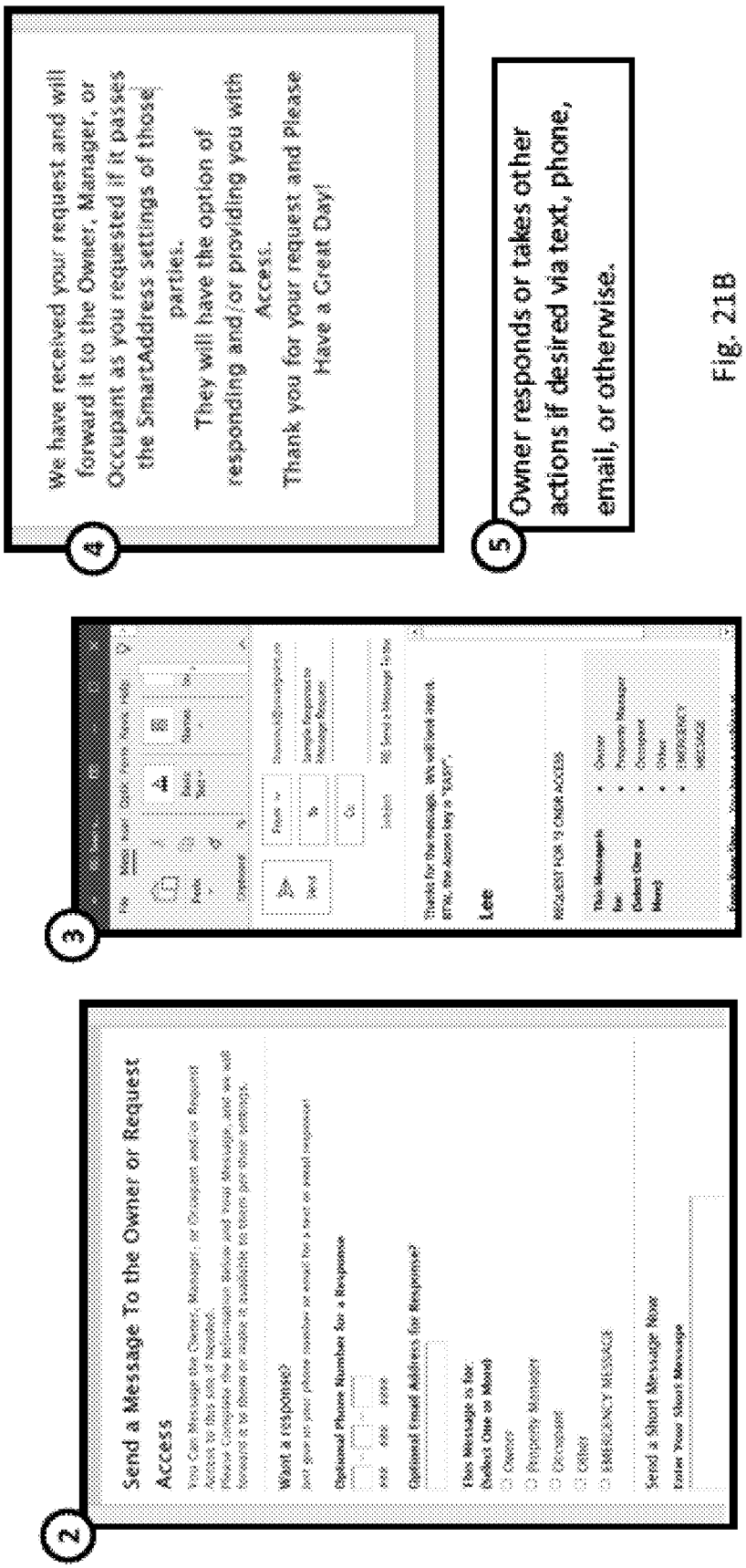

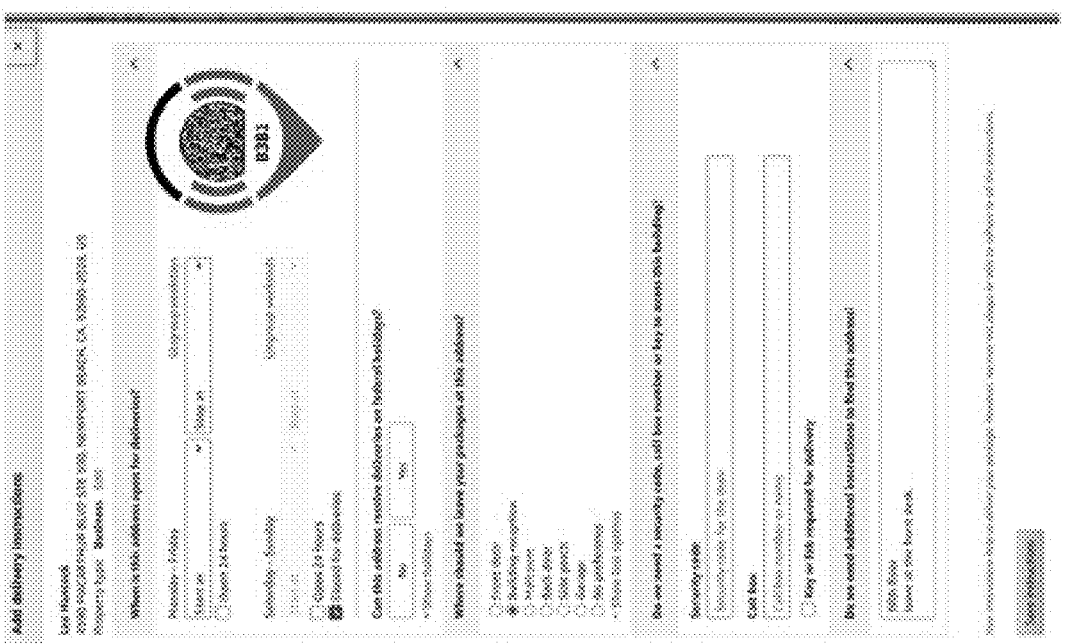
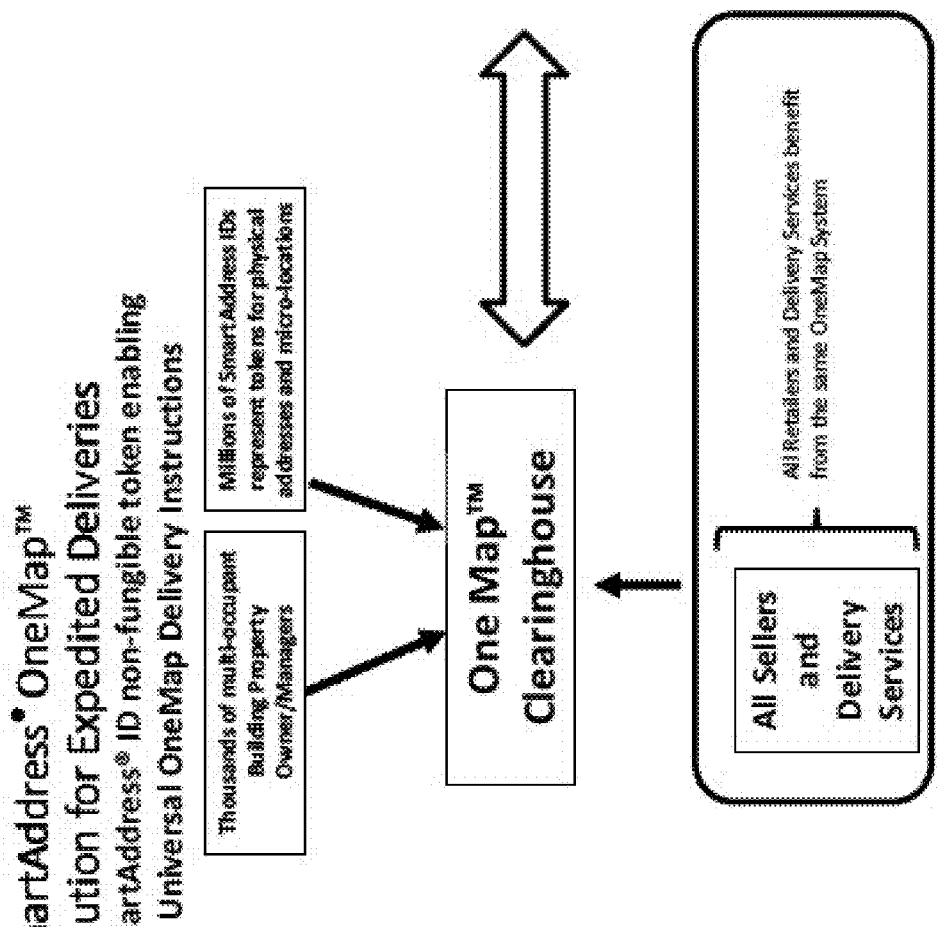
Fig. 22

Example Location Information Micro-location number Used in GPS and other Navigation and Wayfinding Device Examples of Ambient MLNN Identifier for Current and Intended Destination Locations With Real-Time Directions, Compass / Pointer, and Map Example Actual or Virtual Scannable Codes and CIDs with Ambient Micro-Location references in 2D and 3D Visual imagery that allows AR, VR, and other viewing

SYSTEMS AND METHODS FOR VOICE ACTIVATION OF QR AND OTHER SCANNABLE CODES

RELATED APPLICATION DATA

The present application is a continuation of co-pending International Application No. PCT/US2022/038983, filed Jul. 31, 2022, which claims benefit of U.S. provisional application Ser. No. 63/228,078, filed Jul. 31, 2021, the entire disclosures of which are expressly incorporated by reference herein.

TECHNICAL FIELD

The present application relates to devices, systems, and methods to enable users of voice service and interfaces reference, communicate, and activate scannable bar, QR, and other machine-readable codes, activators, and identifiers without the necessity of viewing and/or scanning of such scannable codes. Voice code identifiers can then be used to recognize, capture, and activate scannable and other codes to obtain indoor mapping, wayfinding, navigation and other information and access real-time location and other information, services, processes, communications, or procedures.

In one example, voice code identifiers are assigned, selected, curated, and/or otherwise determined and registered to be unique and functional within discrete geographic locations and other subject areas. These voice code identifiers can then be used in physical, digital, and virtual geographic or other subject areas, including virtual worlds and locations in what is commonly referred to as the metaverse, to reference, communicate, or activate by voice scannable codes, communicate precise locations, or access real-time, micro-location information and services, including real-time location specific detailed digital twin, BIM, LIDAR, videos, images, and other data, information, and content. These short voice code and micro-location identifiers facilitate usage across voice recognition and other devices, systems and services for human to human, human to machine, and machine to machine communications and interactions (collectively, "HMI Interfaces").

The present application also relates to systems and methods for interpreting and resolving such voice code and micro-location identifiers using various systems and methods including artificial intelligence to determine the Subject Area, context or location of the scannable code, user, or usage, and then optimally using the voice code and micro-location identifiers to identify, resolve, activate or otherwise use scannable codes and micro-location identifiers by voice or other input, thereby eliminating the need for machine or device scanning of the underlying scannable codes. The identifiers also work with voice services and voice interfaces with augmented reality, virtual reality, smart glasses, heads-up displays, and other devices and systems where there is an added benefit of facilitating more efficient, fast, and effective voice and human machine interfaces for communicating and referencing locations and machine readable and other codes.

BACKGROUND

Numerous systems have been developed to expedite connecting digital devices or activating various devices, services, or actions through machine readable and/or scannable codes or graphics. Common technologies and systems include Quick Response Codes ("QR Codes", and collectively together with all other barcodes, visual and other identifiers, "Scannable Codes"), near field communications ("NFC"s), Radio Frequency Identification ("RFID" s), blue tooth and other small radio transmitter beacons ("Beacons"). These systems and technologies are used as tags, triggers or other activators of various services (collectively, "Activators"). Such Scannable Codes and other Activators may be tightly associated with locations and micro-locations and provide location information to other services, or they may be of general application without regard to the location of the Scannable Code.

Today Scannable Codes must be physically scanned, and NFCs and RFIDs must be physically activated with some level of proximity or near field communication. LPS and Beacons can be used in connection with applications and software that can track the location of a device and trigger or activate certain content or services based on the proximity of a Device relative to the Beacons or other location determined by geofencing, triangulation and other methodologies. However, Beacons typically require numerous devices and client side, downloadable applications, users' permissions to be enable automatic and background location tacking through LPS and Devices and/or connectivity to the LPS, Beacons or otherwise. These systems typically also require persistent CPU usage and location monitoring to achieve live, 'blue dot' real-time navigation and guidance or micro-location information.

SUMMARY

The present application is directed to systems and methods to enable voice and verbal activation of Scannable Codes and micro location identifiers within subject areas through very short, discrete alpha-numeric and/or numeric references that are easily spoken by voice or otherwise communicated. All of such alphanumeric voice code identifiers, including but not limited to MLNNs, Brands, Keywords, are referred to herein collectively as "Code IDs" or "CIDs"). CIDs can also work separately from the Scannable Code in situations where display and/or scanning is unnecessary, unwanted and/or impractical. Thus, while CIDs will typically be displayed with and adjacent to or otherwise in connection with such Scannable Codes, CIDs may be displayed in lieu of such Scannable Codes in various modalities. CIDs enable users and Devices to identify Scannable Codes, micro-locations and/or communicate or activate such Codes to access various underlying actions through Voice Services, Voice Interfaces, and other verbal communications and interfaces across all Devices and HMI Interfaces.

CIDs complement or provide complementary alternatives to Scannable Codes and are easier for humans, cameras, and devices to see, store, communicate, remember, write down, and use across virtually all Devices, systems, languages, software and platforms. CIDs are typically, but not necessarily, related to specific geographic locations or areas ("Subject Areas" or "SAs"). Scannable Codes and Activators otherwise typically encode or resolve to digital manifestations of long character strings unique throughout the world, e.g., like a URL, hashtag, phone number, or some other globally unique identifier. Because they are unique throughout the world and optimized solely for machines, these character strings are typically very long, unreadable, and virtually impossible for quick human cognition, voicing, communications, input, or other use by humans. There is currently no way to activate Scannable Codes by voice, and there is a need for alternative systems and methods to activate Scannable Codes and Activators by voice in physical and virtual worlds.

There are also a growing number of voice-activated devices and interfaces designed to enable users to access or publish information, services, control Devices, initiate requests or other communications, etc., with voice commands and responses. These voice services include services like Siri, Alexa, Google Assistant, etc. mobile phone, automotive, and all other voice services (collectively, "Voice Interfaces" or "Voice Services") and collectively hand billions of queries or commands daily. Most of these Voice Services work with phones and other Devices with cameras, keypads, and other input Devices and mechanisms. Voice Interfaces and Voice Services do not currently provide a mechanism for users to see, know, or voice their precise location or verbally identify, activate, or use Scannable Codes. Voice identifiers can also broadcast on demand or otherwise by audio and or by visually and other impaired users to activate Scannable Codes or determine or reference pinpoint micro-locations by voice using CIDs or MLNNs.

There are a growing number of Devices and visual displays that do not contain handheld cameras, sensors capable of scanning and reading Activators, etc. These include new technologies for human, vehicle, and other navigation and wayfinding, including autonomous vehicles (AV), artificial intelligence (AI), machine learning (ML), augmented reality (AR), virtual reality (VR), national language processing (NLP), drones, robots, and other similar Devices that may be worn (e.g., glasses, smart watches, AR headsets) or carried. Similar existing and future systems are being developed such as brain-computer, mind-machine, neural controlled, and direct neural interfaces (collectively, "Brain Computer Interfaces" or "BCIs"), and together with such other technologies and devices, individually an "Autonomous Device" or "AD" and collectively "Autonomous Devices" or "ADs").

Devices also include fixed and portable Devices such as speakers, electronics, televisions and monitors, and dedicated voice access Devices such as Echo Dots, Google Assistant, etc.; head, wrist, or body hand-held or worn and spatial projector display, GPS and mapping devices and displays, phones, watches, clothes, hats, and other wearable devices, smart glasses and other optical and video see through displays, head-up displays, helmet mounted displays, handheld AR and VR devices, holographic displays, and other types of headsets, vehicle navigation system, voice navigation, wayfinding, and picking systems, Internet of Things ("IoT") devices, etc. (collectively, "Devices").

There is a need for Voice Services and Voice Interfaces to enable users to quickly yet precisely communicate and activate Scannable Codes, locations, and other Activations or access to information that are designed and optimized for Voice Services and Voice Interfaces for Screens, keypads, and physical input options will likely be reduced, eliminated, or minimized for many Devices. Further, even in the absence of machine-readable Scannable Codes, it would be advantageous if micro-locations and/or the detailed information associated with micro-locations or devices and Scannable Codes could be accessed with voice code identifiers notwithstanding or in lieu of the visual presence of an associated Scannable Code. Further, it would be advantageous to have a voice focused system that bypassed the need for Scannable Codes and Activators completely, providing a short, concise, simple, familiar alternative to Scannable Codes and Activators optimized for Voice Interfaces and Voice Services.

U.S. Pat. No. 10,296,568 and other related patents identify certain systems and methods for disambiguating and enhancing terms included in communications through intelligent sending and receiving agents, optionally in combination with remote servers or databases, that can take into account all information and contexts known or determinable by such components in order to 1) facilitate the communication of more precise, accurate, and detailed location references and information; 2) disambiguate any term in the communication, and 3) abbreviate and compress the length of the communication to enable more abbreviated, yet also more precise communications.

U.S. Pat. No. 10,956,457 [and U.S. patent application Ser. No. 17/544,898] and other related patents establish a new paradigm for transforming nonlocational identifiers into location identifiers (LIDs) and micro-location identifiers (MLIDs) for purposes of discrete referencing of fixed or variable locations and related information together with real-time control by the creators and owners of such LIDs and MLIDs. These technologies enable shorter, easier, yet more precise and discrete location referencing, particularly with respect to sub-street address level 'micro-locations', and further enable real-time, permission-based ownership and control of the use of such LIDs and MLIDs. These representative patents teach novel systems and methods primarily for referencing locations of all types and sizes, with particular emphasis on real-time, micro-locations and related information, services, and communications, real-time, permission-based privacy systems.

What is needed are new systems and methods to 1) enable Scannable Codes, Activators, and other identifiers, and other codes (collectively, "Codes") to be recognized, verbalized, captured, remembered, and easily and accurately communicated verbally and otherwise by humans, 2) enable machines and humans to see and verbalize such Codes, and 3) enable such Code references to be shared and used in real-time between humans and humans, humans and machines, and machine-to-machine interactions. It would also be advantageous if the Voice Services could provide a new core and foundational utility enabling abbreviated, structured, voice references of various information for simplified, AI-enabled, human-friendly data structures, business intelligence, and further enabled related systems to track, monitor, and iterate on the usage to improve the efficacy of such systems and enable new methods of valuing and monetizing such usage.

MLNNs and CIDs can also constitute a series of ambient micro-location references in a way that enables users to know, speak, and otherwise communicate and use MLNNs to reference nearby micro-locations by voice with tremendous precision and simplicity. The primary objectives of the system are simplicity, brevity, precision, interoperability across all Voice Services, Voice Interfaces, and Devices, and flexibility for human communications and interactions. However, the technologies are also beneficial for machines and computer programming, AI, AR, and VR, where there is an added benefit of facilitating more efficient and effective HMIs. As used herein, a MLNN refers to a micro-location locator name and/or number ("Micro-Location Name Number", or "MLNN") may be used to access information, services, or communications related to the scannable code or associated locations. Examples include rooms, doors, offices, chairs, seats, signs, the location of a person or animal, location of a tree, etc.

Voice enabled code identifiers can also be used to reference any general 2D or 3D micro-locations by voice, whether the micro-locations are to identify the physical or virtual location of the Scannable Code or identify the general area or other micro-locations near or associated with the Scannable Code or in the absence of a Scannable Code. CIDs can be used audibly by broadcasting on demand by audio. CIDs can also facilitate scanning by cameras and other devices for visually and other impaired users to disclose and broadcast or activate scannable codes and to determine or reference by voice pinpoint micro-locations and provide real-time micro-location information, services, and communications. For example, as shown in FIG. 27, actual or virtual Codes and CIDs can be added to physical and virtual signage and captured and decoded by cameras in AR, VR, and other similar uses.

Voice identifiers enable AR, VR and other Displays to display CIDs for voice activation with or without the display of the associated Scannable Codes. Such displays could also eliminate or hide the Scannable Code since in many case voice activations enabled pursuant to the systems and methods taught herein will be faster and easier than finding, accessing, and using a device with a camera to scan or otherwise activate a Scannable Code or other Activator. CIDs can also be easily read, understood, spoken, written down, inputted and used in software programs such as Excel, Word, PowerPoint or other database or interfaces, expedite communication from humans to humans via voice, text, tweets and other social media, HMI Interfaces, or any other modality.

The systems and methods herein may enable Scannable Codes and Activators to be labeled, referenced by voice, identified, activated, or alternatively designated by a very short alpha numeric character string, usually just a short number to facilitate interoperability and usage across all languages, dialects, etc. as well as facilitating communications by impaired individuals. CIDs can be viewed, read, remembered, input, spoken, voiced, or otherwise used to communicate verbally by humans to other humans and and/or machines and Devices. CIDs will typically be extremely short and simple, with the AI and ML processes incorporated into the system for selecting and using CIDs within SAs typically including a specific or general location and code registry to associate short CIDs with specific Codes when activated in close proximity. Other complementary systems for parsing and using CIDs include the nature or identity of any Devices associated with the Codes or usages, the identity and information related to the person(s) using the CID, the nature of the CID and underlying Codes, or any other information or context the AI and ML processes know, ascertain, access, or otherwise learn about the context of the user or usage.

The systems and methods herein may enable users and machines to definitively verbally reference Codes and precise 2D and 3D locations with short CIDs. This is particularly helpful for Voice Interfaces and Voice Services, and it will facilitate the use and capabilities of BCIs and Activations, communications, and other usage by impaired users because the abbreviated CID structure and systems enable extremely short, limited, and simplified characters strings that are easier to see and communicate. The system enables the use of duplicate, non-discrete CIDs throughout the world to facilitate human use and communication, and uses micro-location information AI, ML, and other systems to disambiguate, interpret, use and enhance the CIDs in any given physical or virtual subject area or use, increasing the allowable yet functional brevity, simplicity, usability, and efficacy of Codes and CIDs. The system has the potential to the become the sine qua non of utilizing Codes verbally, and in many situations may eventually bypass and make the display and scanning of the scannable Codes obsolete.

One of the methods used to disambiguate a CID is by associating the CID with specific physical or virtual locations or areas, including any building, structure, floor, room or other small area, Network (as defined below), whether digitally geographically geofenced or not. As used herein, any or all of these physical and virtual locations and relevant areas may be referred to as Subject Areas (SAs), and/or Reference Subject Areas (RSAs). SAs and RSAs can be defined by the operator or owner/creator of the specific Scannable Code or Activator and CIDs, MLNNs, SAs, and RSAs can be defined by the system prior to or contemporaneous with the use and display of CIDs. They can also be defined by the operator of any platform, sub-platform, system or sub-system designed to use CIDs, in any specific or general application or system. Importantly, CIDs may be selected or assigned in a manner that also provide a short reference to the precise geography of the associated SA or CID, effectively enabling the CID to serve as an ambient micro-location identifier across numerous devices and services. SAs and RSAs can be based on or complementary to point clouds and other areas defined by Building Information Modeling ("BIM"), Light Detection and Ranging ("LI-DAR"), digital photos, interactive or other 2D and 3D videos or tours, or other physical and digital design, blueprint, CAD or other similar systems. SAs, MLNNs and designated 2D and 3D micro-locations can further be designed and based on visual video or static images, zones, areas, or other designators, whether based on fixed or physical or virtual locations, areas, or things.

Subject Areas can be precisely defined, named or not, and used and/or tokenized in many ways, including hierarchically structured by country, geopolitical subdivisions, neighborhoods, geographic areas, real estate campus or project developments or other areas. Alternatively, SAs can also be generalized and not pre-defined but rather learned and adjusted by AI and monitoring the creation and use of CIDs to optimize operational functionality among fixed or variable user groups and areas. They can also be created on demand and used only temporarily for specific limited usages, and/or can be based or used for specific Voice Services or Devices, or general in nature and designed to be utilized by all Voice Services globally or in specific SAs.

Tokenized SAs can be created, owned, bought, leased, rented, and otherwise monetized directly or indirectly, including participation in subsets or sub-locations or smaller SAs associated with larger SAs. For example, SAs may be created for a country or city, and be entitled to a portion of the ownership and control of SAs that are within the larger country or city SA in order to provide discrete CIDs for any given SA. Similarly, an SA for a city (whether or not within the scope or ownership of the overarching SA for a country), maybe be entitled to a portion of the ownership, control, and monetization of SAs, specific micro-locations that are withing the defined area of the larger SA as well as CIDs curated and deployed pursuant to the system in one or more SAs. Advantageously, SAs and CIDs can be represented by blockchain identifier, tokens or other unique identifiers, can be exclusive or non-exclusive, and can be resolved on-chain to reflect the status of every transaction on the block-chain or off-chain in connection with certain on-chain transactions, data, proofs and activities.

CIDs and SAs can also be variable and dynamic, for example, to be coincident with the content displayed on a web page or otherwise viewable by the user. Variable dynamic CIDs can be parsed and interpreted based on the time of the display or usage or any other context, thereby adding both flexibility and verification/proof of location at any given time. SAs may be very specific (e.g., a specific building, room, vehicle, plane, bus, Device, etc.) or general and can be defined precisely or generally (manually, structurally, or automatically through a combination of AI, ML, and other knowledge of SAs or any other means) to suit the needs of creators, owners, operators, users, and others.

Optionally, SAs and CIDs can also be optimized by or for any given user and AI/ML feedback loops enable the system (s) to iterate, adjust and improve SAs and CIDs for specific user characteristics and preferences, including real-time and conditional privacy settings and preferences, and related information to optimize disambiguation from time to time to improve the efficacy of the system(s). All of the SAs and other information and contexts used by the system may utilize both discrete SAs, CIDs, etc. and/or can use AI and ML to facilitate 'fuzzy' or 'elastic' disambiguation and parsing of any CID relative to any SA.

The overall CID system may include a discrete registry and clearinghouse for all specifically named or otherwise designated SAs, or CIDs and CIDs and SAs may be represented by fungible or non-fungible tokens or other similar structure, whether created and curated through a decentralized ledger or blockchain methodology or otherwise. They may be automatically generated in real-time or based on micro-locations or 2D, 3D, hierarchical, hybrid, egocentric, or allocentric global or localized grid and location coordinate systems or some other type of universal location or other reference systems (collectively, "Coordinate Systems"). It is important to note that CIDs will all generally use similar and familiar, standardized HMIs and visual displays to facilitate interoperability across virtually CID enabled Devices.

One benefit of the CID systems and methods described herein is that end users may be presented with the same or substantially similar interfaces and short CIDs and an ambient MLNN micro-location voiceable reference regardless of the underlying methodology and details incorporated into the underlying definitions of SAs and CIDs, disambiguation methodologies, Coordinate Systems, SA and CID creation, curation, registration, and allocation methodologies. Thus, users and Devices/machines can learn and utilize the information in a consistent and standard, simple and familiar format and interface even though the underlying CID voice references, SAs, and Codes or other related components are based on different underlying methodologies, systems, and voice references. These simplified and short CIDs for Voice Services and Voice Interfaces are new and succinct, and they are designed to utilize limited character/numeric sets to facilitate multi-lingual, multi-dialect, and multi-cultural interoperability with a brief, simple, yet familiar and effective system to activate and interact with Codes with CIDs through Voice Services and Voice Interfaces across virtually all disciplines, uses, modalities, to access virtually all underlying information, activities, communications, etc. associated with Codes, whether or not such Codes are displayed with the CIDs.

BRIEF DESCRIPTION OF THE DRAWINGS

The invention is best understood from the following detailed description when read in conjunction with the accompanying drawings. It is emphasized that, according to common practice, the various features and design elements of the drawings are not to-scale. On the contrary, the dimensions of the various features and design elements are arbitrarily expanded or reduced for clarity. Included in the drawings are the following figures.

FIGS. 8A and 8B show exemplary displays of CIDs and MLNNs on various digital displays in electronic devices, including alternating displays of other digital information including CIDs and MLNNs for various alternative purposes.

FIG. 11 shows an exemplary use of CIDs with and without the associated Scannable Codes in a digital display of a map and satellite image for one or more locations with respect to the SA for a specific office building and parcel.

FIG. 12 shows an exemplary use of CIDs for various activations and purposes within an online internet browser display and without the associated Scannable Codes and a visually referenced SA as well as exemplary voice commands to be used with exemplary Voice Services to select various actions on the page.

FIG. 13 shows exemplary uses of CIDs with various displays (e.g., television, Wikipedia information pages and content, door, room, and other visual signage and content) together with exemplary locator signs and CIDs for activating various location services, including emergency 9-1-1 services with CIDs that both activate the underlying Code and provide precise ambient micro-location voice references and related information, services, and communications.

FIG. 16 shows exemplary uses of CIDs with Exit and other wayfinding signage and systems that both activate the underlying Code to access micro-location specific, content, services, or information, enable the communication of precise location or other information to or from the end users, and enable voice referencing or communication of ambient micro-location references for both the current location and intended destination (e.g., exit route or emergency gathering location).

FIGS. 21A and 21B show an exemplary sequence of using initiating real-time screened and filtered communications to owners, operators, or occupants of real property, buildings or other property without providing phone numbers, email addresses, or other personal identifiable information to senders.

FIG. 22 shows an exemplary uses of CIDs and MLNNs to designate and access by voice universal micro-location delivery instructions with ambient micro-location references controlled by recipients and made available to all delivery services and personnel through Voice Interfaces and Voice Services to expedite and provide standardized instructions for food, parcel, and other deliveries.

DETAILED DESCRIPTION

Figure 1A:
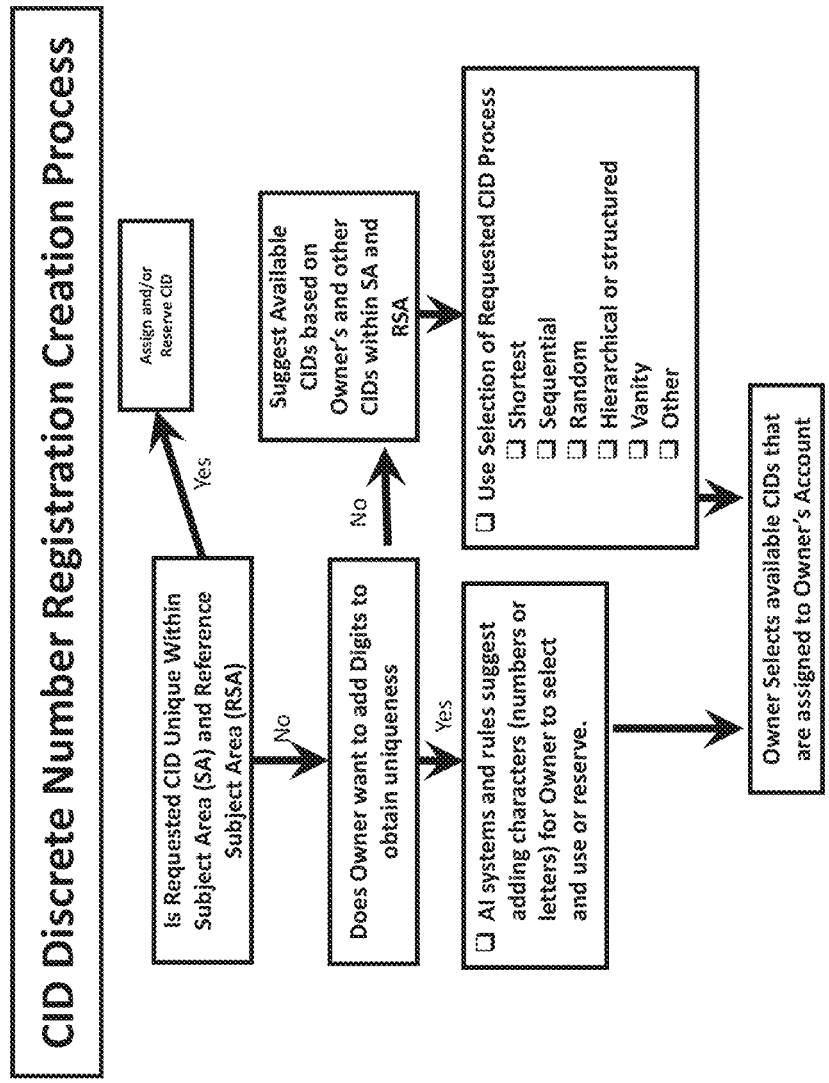
FIGS. 1A and 1B are schematics showing two exemplary alternative sequences of steps, logic, and processes for the selection, creation, and registration of CIDs for Codes within SAs and RSAs based on the identifiability and availability of particular CID within a unique SA or optional creation of an appropriate CID for Codes with the SA or RSA.

Before the examples are described, it is to be understood that the invention is not limited to particular embodiments described, as such may, of course, vary. It is also to be understood that the terminology used herein is for the purpose of describing particular examples only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials are now described.

It must be noted that as used herein and in the appended claims, the singular forms "a," "an," and "the" include plural referents unless the context clearly dictates otherwise. Thus, for example, reference to "a compound" includes a plurality of such compounds and reference to "the device" includes reference to one or more devices and equivalents thereof known to those skilled in the art, and so forth.

The systems and methods described herein provide a new and novel way to enable voice referencing, activation, opening and other operations of Scannable Codes by voice shortcode identifiers (CIDs) that are registered within discrete or other Subject Areas or SA so that the CID is unique and actionable in and around the SA. Scannable Codes are typically unique globally and/or resolve the same regardless of any context of location or otherwise. Thus, Scannable Codes typically translate into or reference long, unique character strings that are either actually or practicably incapable of human use by voice or spoken words or numbers.

The processes, systems, and methods taught herein include several integrated steps to automatically define and/or utilize geographic and other Subject Area to enable CIDs to be created, assigned, curated, or otherwise managed in real time such that extremely short CIDs can be enabled to be referenced by voice with spoken words, characters, or numbers. CIDs are a new thing conceived and developed to address the growing needs of Voice Services and Voice Interfaces to access narrowing defined or relevant information, services, communications as an ambient bridge to more detailed information, services, activations, etc. currently sometimes available through Scannable Codes. It is anticipated that CIDs will eventually become alternatives to Scannable Codes as more and more devices are capable, and more and more users are familiar with and are using, Devices and Voice Services with Voice Interfaces, potentially to the point of making Scannable Codes created and used pursuant to the systems and methods described herein obsolete or only used as a complement to CIDs.

The implementation and operation of CIDs are based on SAs such that CIDs are unique within the SAs, which can be extremely small and narrow in scope. Thus, CIDs can be substantially shorter and much more easily seen, remembered, communicated, input, or otherwise used, particularly with Voice Services and Voice Interfaces. CIDs may be created and assigned through various SAs, RSAs, and other geographic or other areas, based on any existing or newly developed methodology, including but not limited to: a) existing, legacy, or newly named or unnamed addresses, places, buildings, structures, campuses, projects, complexes, defined or undefined areas or regions; b) MLNNs and other micro-location voice references, whether stand alone or as part of a structured, hierarchical, offset, or other method for organizing and referencing locations, places and areas; c) encrypted, randomized and/or scrambled and unusable by humans; d) based on, component parts of, or derived from a global or other Coordinate Systems such as Universal Transverse Mercator (UTM); c) based on or derived from private, custom, or proprietary coordinate systems and other location references systems like What 3 Words, Placekey.io, Google Plus Codes, SmartPoint Locator Numbers, MLNNs, etc.; f) on demand, virtual, or transitory assigned or created Virtual SA based on specific uses, users, dates, times, events, presentations, and other purposes; g) buildings, offices, homes, multi-family residential structure, apartments, stores, malls, projects, campuses, beaches, parks, lakes, rivers, and other geographic features or points of interest; h) private, egocentric, highly personalized, unique and/or encrypted maps, drawings, schematics, coordinate systems, or other structured references for Smart Homes and Smart Buildings; i) specifically or generally defined areas generally associated with legacy street and postal addresses; j) 2D, 3D, hierarchical, hybrid or combined Coordinate Systems; and k) sequentially assigned, random, offset, encrypted, or even scrambled CIDs that are not based on SA and RSA but utilize other forms of disambiguation.

Figure 1B:
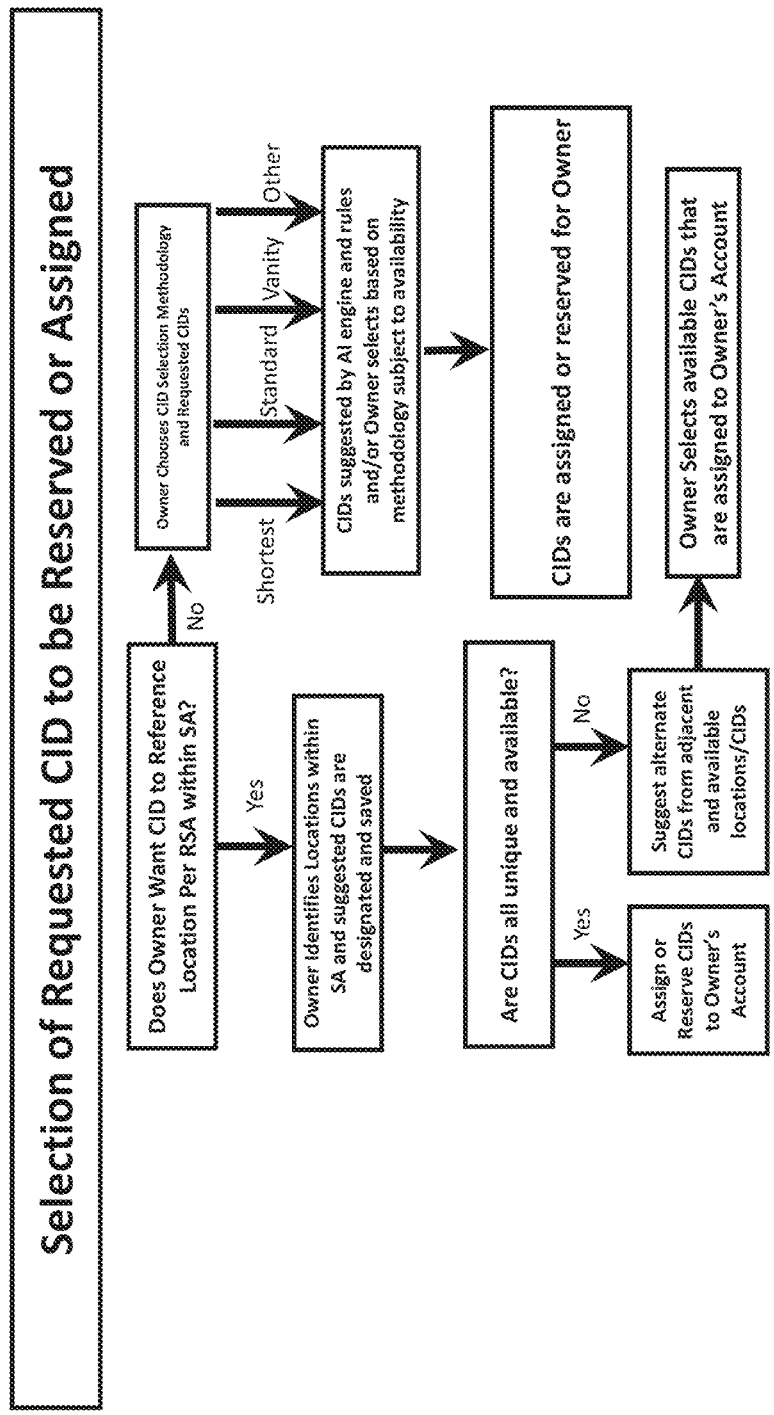

FIGS. 1A and 1B show an exemplary processes to assign CIDs for any given SA. Users may select or request their preferred CID for any given SA, or request automated assignment of the CID for any given SA, and if selected by the user the system processes will determine if that CID number is currently available and unused in that location, area or SA such that there are no two identical CIDs or MLNNs within any given SA. If the requested CID is not unique, the user may be prompted for another CID that is available within that area. If the CID is also intended to be associational or perhaps also used as an MLNN reference relative to a specific micro or other location, the SA may be designed such that every unique CID is locationalized at a very small location by the MLNN locator, in which case whether the locatable CID is located at any exact location will be irrelevant in virtually all applications.

If the user selects automated assignment of CIDs and/or SA, the system determines the relevant characteristics of the anticipated use of the CIDs for any given SA and can automatically assign the CID based on available known or ascertainable information.

For example, for a location reference in an airport, whether the CID based on location is this exact microlocation associated with a CID based on a coordinate system is rarely critical, and thus the system can easily provide an alternate unique MLNN locator-based CID that is discrete yet locationally accurate enough to provide the locational disambiguation and functionality sufficiently for human scale navigation, information and communications. In this manner, MLNN locator numbers and CIDs may be geographically and/or functionally coordinated. In one example, MLNN locators will be deployed such that MLNNs for any given area may provide very precise discrete referencing (e.g. about 3 feet). If an automatically assigned MLNN for any location would be duplicative of a MLNN CID already in use, then the system can adjust the MLNN to ensure that it discrete withing the SA, notwithstanding that the preferred location is not coincident with the MLNN. The primary characteristic of the MLNN is uniqueness within any given SA or use, and the system can adjust the MLNN accordingly.

Figure 2:
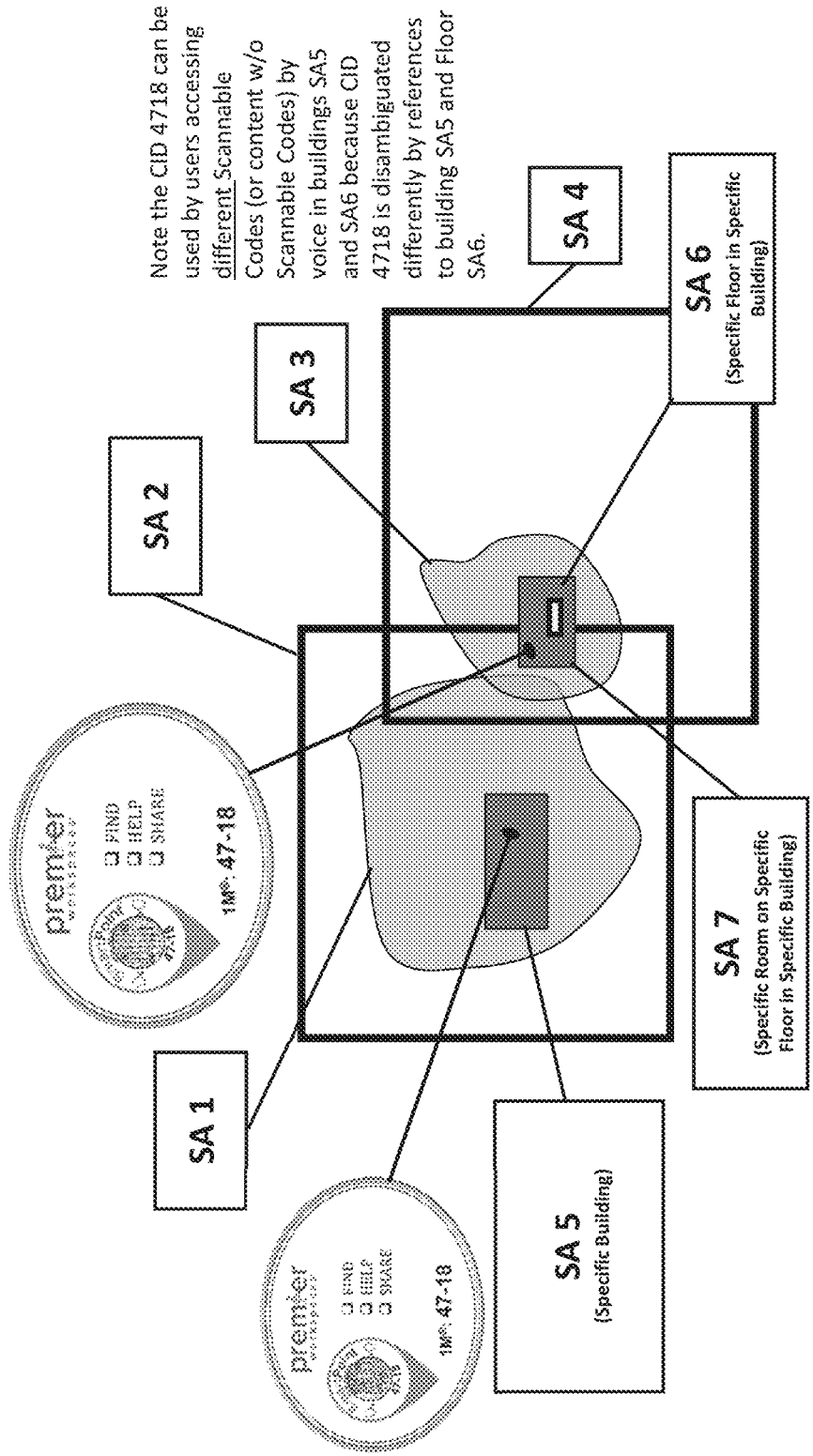
FIG. 2 is a diagram showing examples of multiple SAs for areas, buildings, floors, rooms, and locator signs including Codes and voice-enabled duplicate CIDs associated with each different SA.

FIG. 2 is a diagram showing examples of multiple overlapping an non-overlapping SAs for areas, parcels, floors, rooms, etc. and exemplary locator signs including Codes and duplicate CIDs that are effective because of the systems and methods taught herein. Through the various steps of defining SAs and deploying CIDs, the system enable extremely brief yet effective CIDs for any given area. Because of the benefits of CIDs within SAs, it is expected that CIDs will be used primary with smaller SAs by users seeking proximate information in terms of time and space. Therefore, SAs and CIDs can be deployed by individuals, companies, and system operators to maximize usability and efficacy of CIDs and increase the use of Scannable Codes by an order of magnitude.

Turning to the additional ordered steps and methods of determining SAs and assigning CIDs, FIGS. 4A, 4B, 5A, and 5B show the various detailed database, components, ordered steps and processes, which can be implemented on-blockchain or off blockchain in order to enable the creation sand curation of SAs, CIDs, and Tokens and the subsequent use, parsing, resolving, and payment components of the systems and methods herein.

FIGS. 6, 7, 8A, 8B, 14, and 23 show various exemplary displays of Codes and CIDs in connection with restroom signage, preset pickup and drop-off locations and signage, with Devices such as clocks, thermostats, and dedicated physical Voice Services and Voice Interfaces deliveries and rideshare services, healthcare services, real estate management and wayfinding, including adding CIDs to existing signs and signage with or without Codes in order to expedite exact pick up or drop-offs preset locations at the sign, or an alternative of coordinating numerous pickups or drop-offs at numerous precise locations in and around the physical sign by using MLNNs, separately without Codes or together with Codes whereby the system operator or others distributed and dispersed various precise pickup or drop-off locations using MLNN voiceable references.

Figure 10:
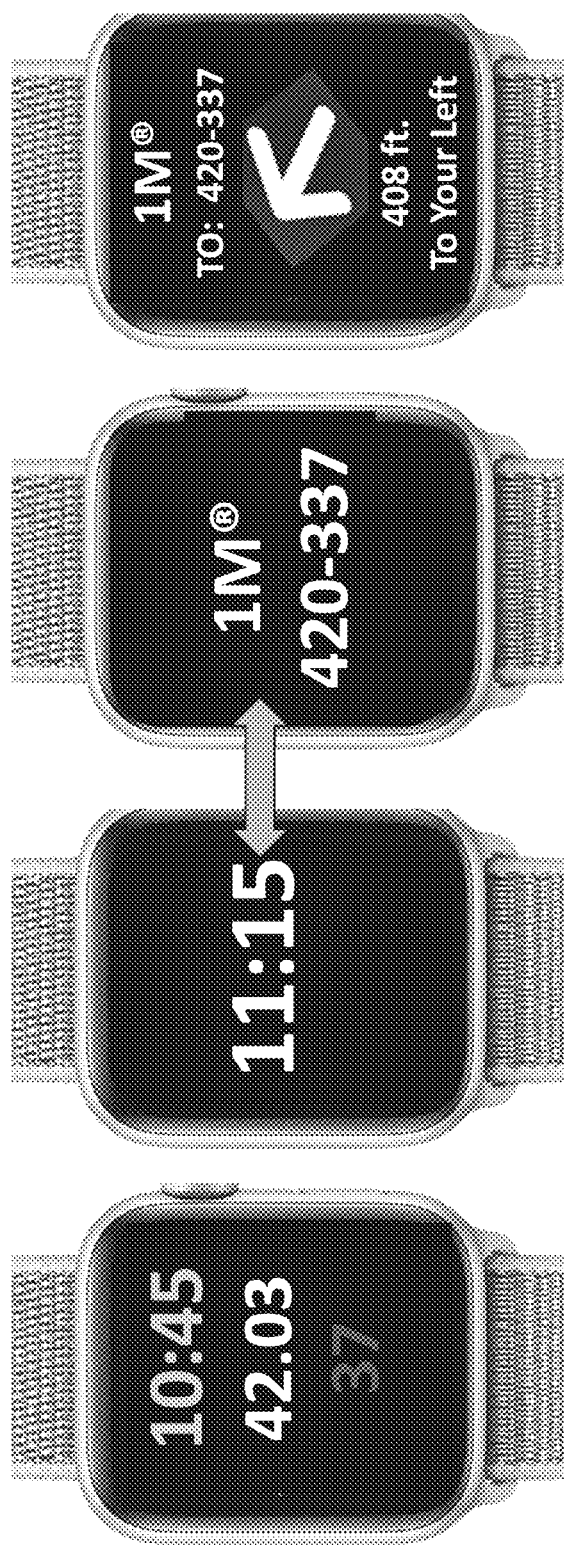
FIG. 10 shows exemplary displays of CIDs for various purposes in an alternating display on a watch face with CIDs activating different Codes or functions.
Figure 24:
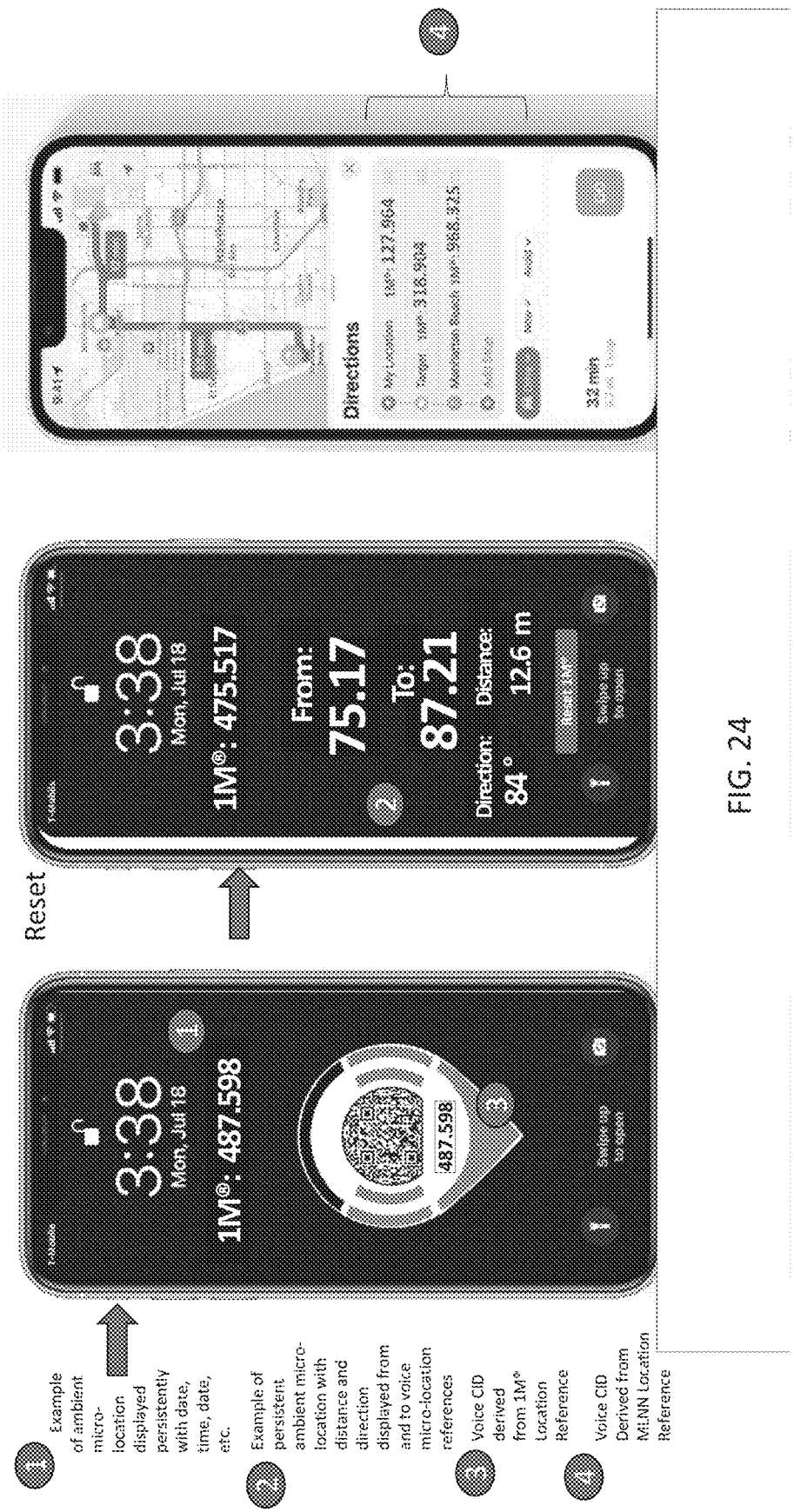
FIG. 24 shows examples of persistent and other displays on alternative mobile phone screens of real-time MLNN ambient micro-location referencing with and without Codes and CIDs to provide location awareness and navigation/wayfinding.

FIGS. 10 and 24 demonstrate examples of using and displaying CIDs on watch displays and/or using CIDs with Voice Services and Voice Interfaces as examples of the sequence of information including accessing maps, turn by turn direction, calling and other similar features can be accessed by voice on a watch.

Additional examples and nuances of assigning CIDs automatically or subject to business and protocol rules, include assigning CIDs pursuant to rules and protocols such that certain CIDs for certain purposes (e.g., micro-locational CIDs) are always comprised of an even number of numeric digits, leaving all odd number CIDs available for non-locational CIDs or other purposes that may be assigned or otherwise selected or used for other purposes. Importantly, these SA and CID assignment methodologies will typically be invisible to the end users and the disparate deployment of the systems and methods for assigning, curating, and resolving CIDs will such that end users will not have to learn different alternative methodologies for assigning and using SAs and CIDs for different uses. Rather, the system will be interoperable across Devices and Voice Services and CIDs will work with the necessity of end users understanding the various methodologies and structure of the underlying CID creation or use deployed by the system.

CIDs may also be bought and owned for various SAs, including large area (even globally) by systems operators to ensure that the CIDs work across broad areas, or they may be building or other SA specific. This may be particularly helpful where CIDs are Brands or Keywords that are relevant in the particular SA based on location or otherwise. CIDs may also thus be part of an keyword ad purchase program for one or more SAs such that relevant businesses or others (e.g., public service, government, or other services) could bid in real time on the use of the CID with the Scannable Code, where the Scannable Code is dynamic and activates or provides instant access to variable information that is controlled by the then current owner or the CID or the parting bidding on the CID to enable users to access their information, content, services, products or communications with the CID over Voice Services and Voice Interfaces.

CIDs may be further segregated based on time and other determinable variables (e.g., weather, events transpiring at or near the SA, Scannable Code, or CID), and thus can be re-used or even simultaneously used in different locations or SAs. Variable CIDs, SAs, can also be used for proof of presence at narrowly defined SAs that relate to the specific micro-, general, or other location of the Scannable Code which combined with other information that is known or can be ascertained about the identify or location of the user or device or service through which the CID is being used, can verify and provide proof of location for both parsing CIDs as well as providing limited access to information, services, products, or communications only to end uses that can authenticate their micro-location through voice reference to one or more CIDs.

CIDs, SAs, and MLNNs may be used for Smart Homes and Smart Buildings to label, curate, and manage locations, devices or components of any such structures as well as to facilitate, expedite, and organize personal, device, building, home, farm, warehouse, or other facilities and information, proof of ownership, document storage and virtual vaults for information. Such documents or other information storage associated with a device, property, contract, or other matter (e.g., a lease, purchase agreement, warranty, instruction manual, description or record of plantings, locations of evidence of pests or other matters, or the nature and extent of treatments) may be added to the digital storage and accessed by voice reference to the CIDs, and used by subsequent owners, local, state, or other regulators or governmental authorities, whether publicly available or combined with access control systems to ensure privacy and non-public use of the information. Owners may define an SA for their building, home, property, farm, location or other area to enable short CIDs related to the MLNN locator numbers to facilitate locational cognition or usage, or the CIDs may be unrelated to the underlying MLNN locators. CIDs may be titled, owned and transferred to others separate from, or in connection with title to the underlying property encompassing the SA.

CIDs and ambient MLNN locators can be used to provide a near universal indoor real-time, micro-location referencing system for big box and other retailers, warehouses, nurseries, stadium and arenas, swap meets, car shows, golf tournaments and other sporting events or other similar location or place to help end users of all types find, navigate/wayfind to, learn or communicate about, or otherwise interact with micro-locations. For example, CIDs can be displayed through a big box retailer every few feet on each side of every aisle, endcap, outside or any other location, and the CID can be used to provide exact location information for the origin of any search, destination or waypoint.

For example, a user may ask their mobile phone or other electronic device "Google, I'm at 772.191 and need to find ladders, lawn furniture, and electric drills." The CID 772.191 may provide the exact location of the user to a third party, which can determine through the system that this location is inside the Home Depot store, and the search engine can then search its database to determine the location of all of those requested goods and services. Google (or other search engine or service) can then respond with the CID or MLNN locator for each item: "ladders are at 71.19, lawn furniture is at 23.02, and electric drills are at 23.74. Would you like directions to ladders?" Google can also display those locations on a map or image (including floor plans and other graphics) including simple pointers providing general distance and direction to the requested products, together with paths or arrows showing the route if desired.

Similarly, systems and databases can provide the micro-location reference for the location of such products and services with as simple voice reference to the ambient location number. Devices, such as mobile phones, can then display the persistent distance and direction to the designated location, or the user can elect to see a static display and reset or update the distance to the desired destination upon demand. The user can also reference their current, intended, or other location verbally by merely referencing the ambient location number, such as 71.19, and/or communicate the ambient location number to a friend to tell them to meet me, e.g., at 71.19. The recipient then can communicate with a totally separate device, service or system such as "Hey Siri, I need directions to 71.19." If one of the recipients is not near the specific store, the system can nevertheless resolve 71.19 through AI and information known or determinable related to the communication (such as the SA, context, or other information), and the remote person can get directions to the Home Depot, but also custom wayfinding to the 71.19 location including what entrance to the parking lot, where to park, what entrance to the building, etc.

Figure 3:
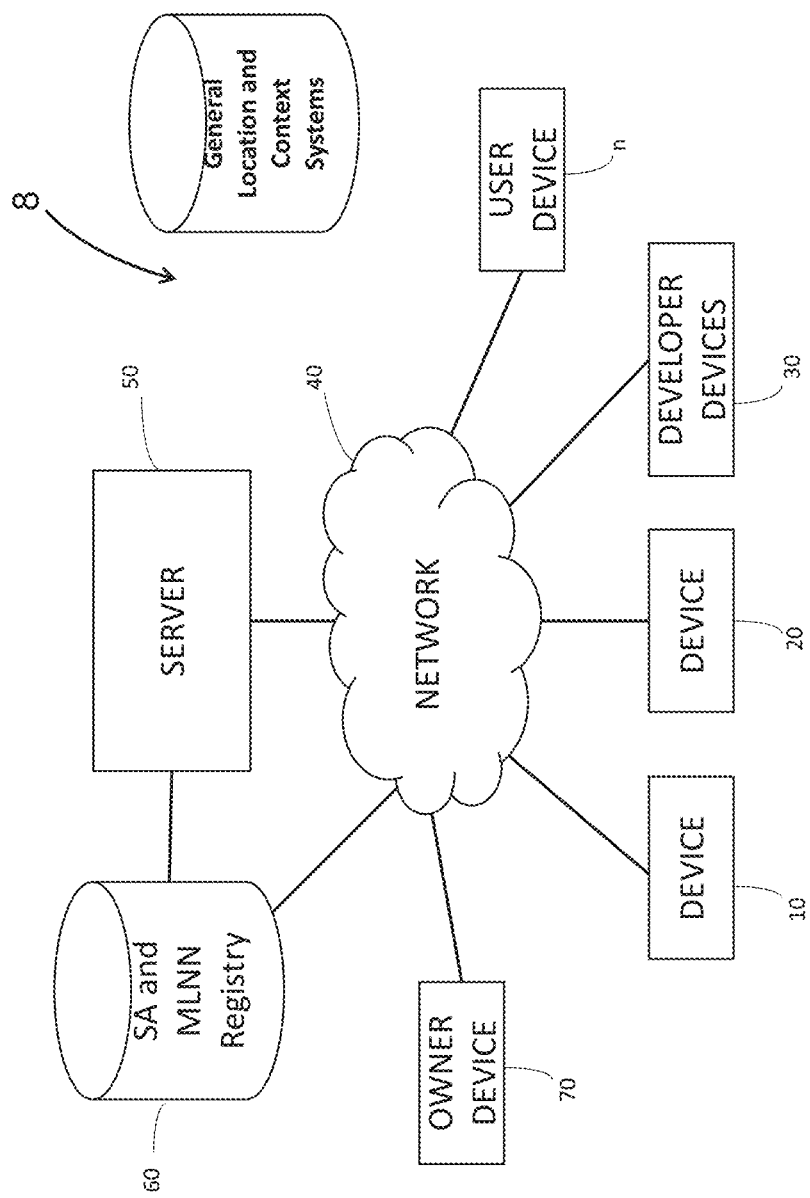
FIG. 3 is a schematic showing an exemplary network architecture of a system for registering and/or using MLIDs according to the systems and methods herein.

Turning to FIG. 3, an example of a system 8 is shown for performing the various methods and/or functions described herein. As shown, the system 8 includes various devices connected to a network 40, such as user devices 10, 20, 30, n, a server 50, and a MLNN registry 60. In addition or alternatively, the system 8 may also include one or more owner electronic devices 70 (one shown for simplicity) connected to the network 40 for communicating with the server 50 and/or registry 60 via the network.

For example, client, servers, and other systems may be created for establishing, curating, controlling, searching, and/or otherwise using MLNNs by owners and/or users, according to the systems and methods described herein, including various devices connected to a network, such as various mobile and other user computers, phones, vehicle navigations systems, and other devices connected to a private or public network, including a wide area network ("WAN"), a local area network ("LAN"), an intranet, a wireless network, a short messaging service ("SMS"), or a telephony network. For example, any such network may incorporate several different types of networks including a WAN, a LAN, and/or a wireless network. One such network including multiple different types of networks is the Internet.

Any of the electronic devices, e.g., the user devices 10-*n*, owner devices 70, and/or other devices implementing the system, may be a desktop computer, a laptop computer, a mobile or cellular telephone, a personal digital assistant (e.g., a Palm Pilot device, Blackberry device, and the like), smart glasses, AR, VR, or other wearable computing devices, interactive television, a vehicle or portable navigation system, a kiosk, a lobby or elevator monitor, or other electronic device, capable of communicating via any such network. Generally, the electronic devices 10-*n* or 70 may include one or more processors, memory and/or storage devices, communication interfaces, and/or User interfaces, e.g., a display, keyboard, mouse, and other types of interactive interfaces (voice, motion, etc.). For example, the interfaces may include one or more input devices, such as a microphone, keyboard, touchscreen, camera, and the like, and one or more output devices, such as a display, speaker, light indicators, and the like.

The devices 10-*n* or 70 may interact with the server 50 and/or CID Registry 60, e.g., by inputting CIDs or other requests that may result in the activation of Codes through CIDs and the information or files provided or communicated or other information related to items of interest associated with the MLNNs as described elsewhere herein.

The CID Registry and database, clearinghouse, access and control, accounting and other modules may include one or more hardware-based components and/or software-based modules for performing the various functions related to the methods performed, as described elsewhere herein. Multiple interoperable or distinct CID Registries and modules may be used for various specific purposes or specific or certain types of CIDs and SAs.

For example, the server 50 may include one or more computer systems, e.g., servers, communicating with one or more databases, e.g., including one or more processors, memory and/or storage devices, and communication interfaces for communicating via the network 40, e.g., with users 10-*n* and/or other parties involved in the methods performed by the system 8. The server 50 may include one or more hardware-based components and/or software-based modules for performing the various functions related to the methods performed, as described elsewhere herein. Although only one server 50 is shown, it will be appreciated that multiple servers (not shown) may be provided at the same or different locations that operate cooperatively to perform the functions described herein. The hardware and/or other components of the server 50 and/or other components of the system may be similar to those disclosed in U.S. Pat. Nos. 5,839,088, 8,935,220, and 10,229,216, the entire disclosures of which are expressly incorporated by reference elsewhere herein.

CIDs and MLNN locators can be used in cities and other places to provide a visual and verbal references for every parking space. CIDs can then be used to purchase parking ("Hey Siri, I need to purchase 2 hours at 231.011") or report leaving ("Hey Siri, I just left parking space 231.011") to facilitate space inventory management. Further, CIDs can be used to quickly communicate the exact parking space for any reason. "Hey Google, I'm at 2992 and need walking directions to Athleta.", "Hey Google, I'm at 2971 and have a dead battery, can you find help?", or "Hey Google, I need directions back to my car at 29.71, and I'm at 299.102". The MLNN references can be used to provide relevant distance and direction, or turn by turn walking or other transit directions on a watch or other devices, e.g., similar to example shown in FIG. 24.

Because CIDs activate scannable codes with access to virtually unlimited information, including the precise microlocation of the scannable or other code, systems can provide information services such as point to point wayfinding and navigation, and communications without the necessity of GPS or LPS to save power consumption and enhance privacy. Whether the CID (e.g., 2971), is an assigned parking space on a specific level of a parking structure, or a specific undesignated location in the parking lot or curbside on a street, the human interface is the same and the AI and other systems can provide enhanced information and services through interoperable systems.

Such locations and references can also be used to define and reference locations by AI or otherwise 'smart' visual cameras or monitors to track usage and occupancy by various persons and devices for simplified communication, big data acquisition, curation, and GIS and other analytics. For example, persons viewing a monitor of an area can verbally identify the precise room being monitored and/or activate an actual or virtual scannable Code by voice. The Code or CID can be displayed or enlarged automatically or by pinpoint selection by the user, mouseover, or other activation.

CIDs, MLNNs, and micro-locators can also be used for golf courses, with MLNNs and CIDs for every significant location, and micro-locator voice references can be used for any other location. CIDs can be displayed at every hole or can be included in any scorecard, diagram, or other materials to reference the location or information for any hole on the course. Underlying MLNNs can then be used to record the exact pin placement on any green and can be easily provided to golfers verbally in a short list of codes. For example, the pin placements on holes 7, 8, and 9 could be referenced with the ambient location MLNNs of 2312, 3889, and 8181, respectively. Golfers can then use such voice MLNN locators to verbally communicate the exact pin location to any voice enabled system to calculate the distance to the pin from any other locations, which can also be inputted through voice by referencing the ambient location by voice using the MLNN. The MLNN or CID could be displayed physically or on any device, smart glasses, or other display, including a GPS device, screen on the golf cart, watch, etc.

Because CIDs are created and/or curated for specific SAs they can also easily reference elevation, they may also provide some elevation or slope information. The voice capabilities of CIDs and MLNNs provide substantial advantages for voice, Device, and systems interoperability for both ambient voice and ambient location services because disparate services can use the CIDs and MLNNs or though standardized processing. Thus, disparate services don't to be connected through servers for machine to machine communications, but the CIDs and MLNNs much more effectively enable human to human, human to machine, and machine to human communications, especially over Voice Services and Voice Interfaces.

CIDs and MLNN voice locators are particularly useful in advanced Wi-Fi, telecom, and other wireless communications and data environments to designate precise locations.

For example, through any activated cell phone, 5G, ultra-wideband, area, Wi-Fi, distributed antenna systems, or other wireless carrier or local enterprise or similar communications networks (collectively, a "Network" or "Networks") for specific events (e.g., concerts, sporting, and broadcast events, etc.) can utilize CIDs and MLNN locators to provide specific location information related to broadcasts, advertising, services, and amenities available at or from specific locations. Both CIDs and ambient MLNNs can be deployed quickly, can be displayed in any signage, on any phone, device or other virtual displays, and eliminate or mitigate the need for complicated and expensive deployment of various types of indoor or local positioning systems such as beacons, ultra-wide band, infrared and other common systems to track and provide approximate micro-location information. Thus, using the CID and MLNN systems is particularly use in short-term deployments where the cost of LPS infrastructure for a short term event or other need would be prohibitive and unwarranted.

Figure 14:
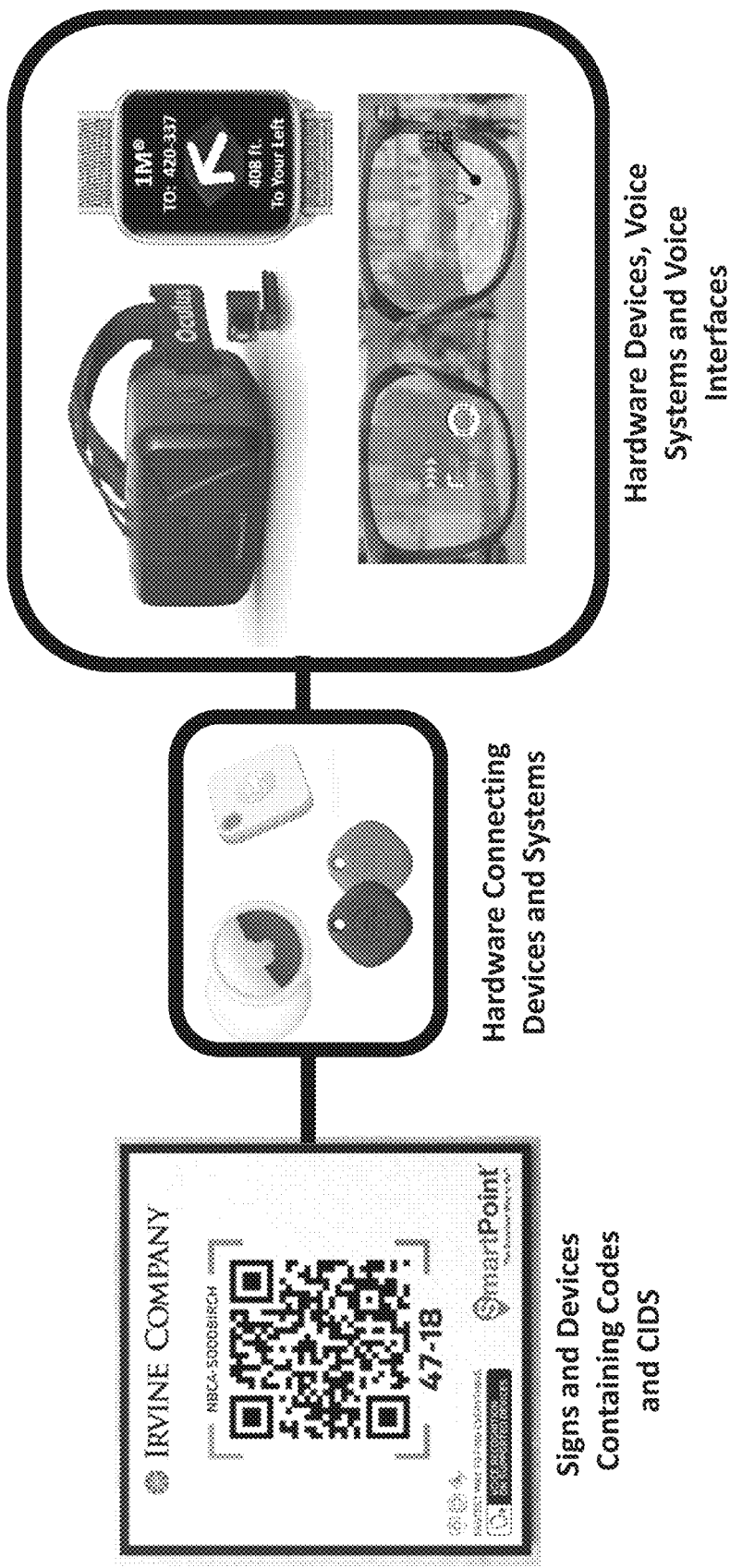
FIG. 14 shows an exemplary use of physical signage displaying Codes and CIDs that include hardware Devices that connect with alternative user Devices that can be used to determine the SA for resolution of CIDs and MLNNs by the systems and methods herein, including AR, VR, smart glasses, watch, and phones.
Figure 15:
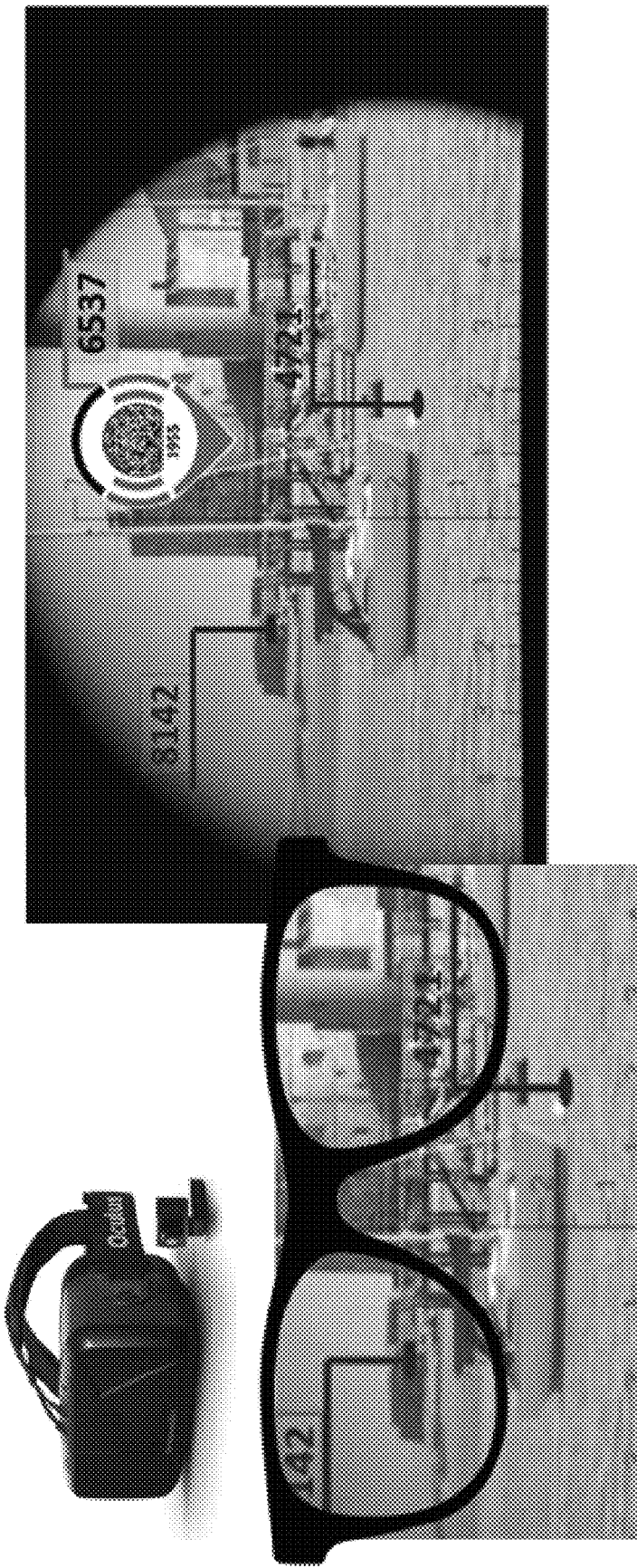
FIG. 15 shows other portable and wearable devices with visual displays using physical and virtual CIDs and MLNNs with displays that both activate the underlying Code to activate or access content, services or information or provide precise ambient micro-location references and related information, services, and communications.
Figure 26:
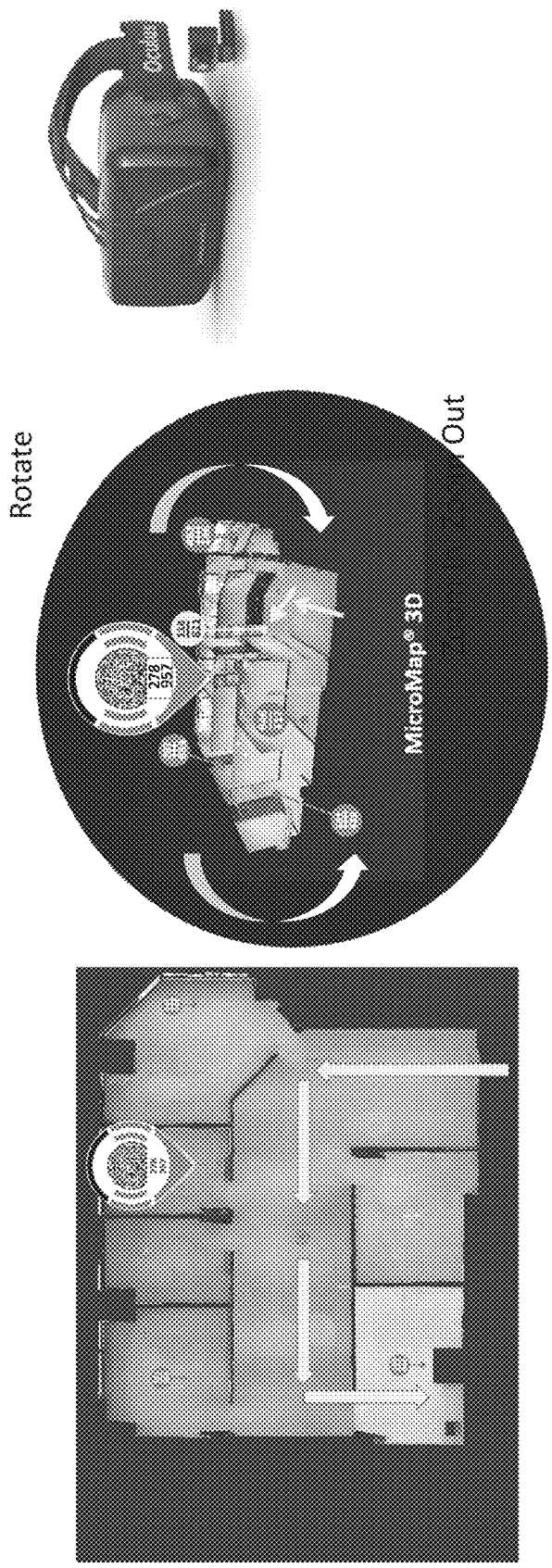
FIG. 26 shows exemplary screen capture of an interactive display of a floor plan and 3D AR, VR or other video tour of an office showing alternative uses of CIDs and MLNNs for voice referencing of locations and devices within such interactive display.

SAs may also reference mobile and online web pages and web content, maps, images, or even documents, and CIDs can be used to reference or communicate one or more items displayed on such pages. For example, if a user is viewing a particular website, map, image, floor plan, AR, VR or other 2D or 3D modeling or viewer, CIDs and MLNNs can be displayed inside such imagery or views and the relevant SAs is known based on the image being viewed. See, e.g. FIGS. 26 and 27, which show examples of interactive 3D images and video tours of an office as might be seen on an AR headset or by clicking through on a web page. Similarly, FIGS. 14 and 15 show examples of actual and virtual displays of Codes with CIDs and augmented reality information displayed in the form of MLNNs for specific micro-location references that can be used to designated, resolve, or communicate an exact location through smart glasses, binoculars, AR/VR displays, etc.

Therefore, e.g., as shown in FIGS. 14, 15, 26, and 27, one or more users can view the virtual or actual CID in the image or the MLNN and activate or share the same by voice through any Voice Services or Voice Interfaces, over the phone or through a text, email, or other communication, and the recipient or device can resolve the voice CID or MLNN with respect to such image or relevant SA. Thus, CIDs and MLNNs can be interoperable across visual and other systems that are not connected and can be used and resolved to designate micro-location with the relevant SA, obtain directions or routing to such location, obtain access to real-time, micro-location information, or otherwise communicate, store, or use the CID and/or MLNN to identify, reference by voice, remember, or use relative to that appropriate SA.

Because of their brevity and limited alpha-numeric character sets, human readability and usability, CIDs and MLNN locators are also uniquely short and useful in various social media and other abbreviated communications such as tweets, snapchats, text messaging, SMS, MMS, mobile and online websites, applications, etc. CIDs and MLNNs uniquely provide human to human communications and interfaces in addition to human to machine interfaces. CIDs also eliminate the need to physically scan the underlying Code and thus can be simultaneously activated or used by multiple end users in the same area, such as a large football or other sporting event, concert, etc. Because of the ambient, pervasive, and interoperable yet precise nature of MLNNs, they can be used anywhere for anything for simple effective communications.

Figure 25:
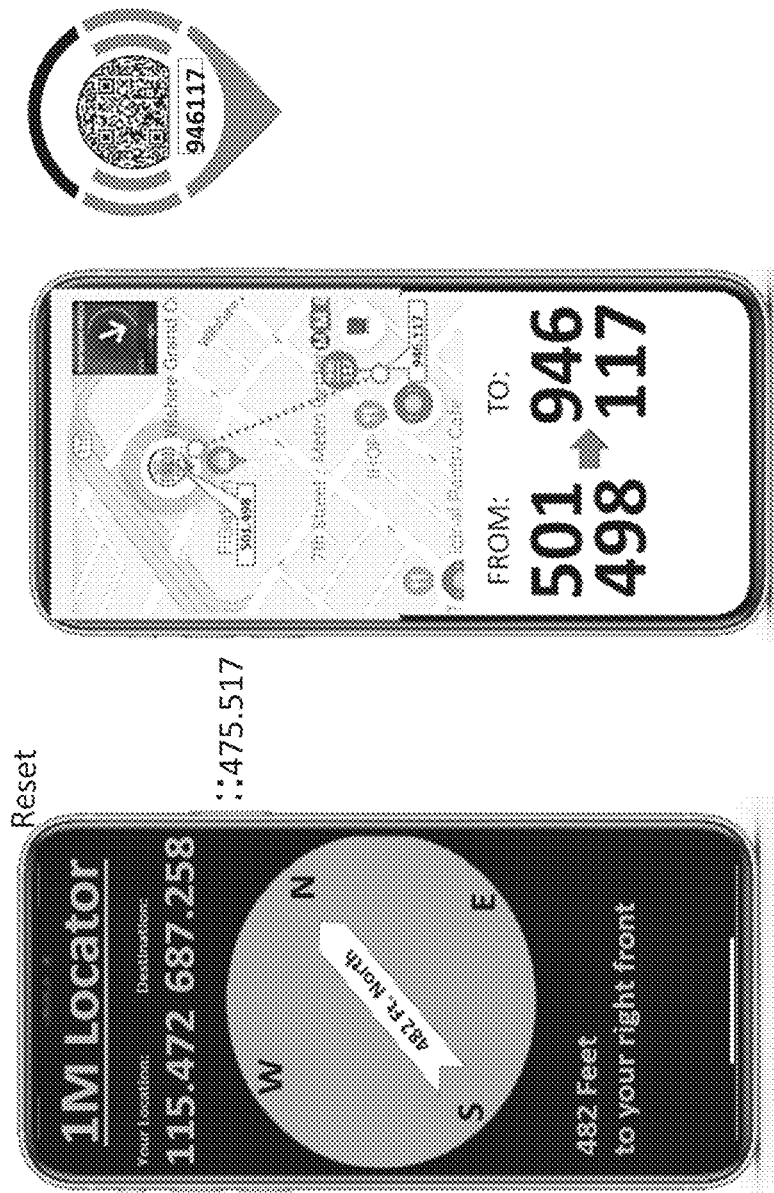
FIG. 25 shows exemplary screen displays of maps and simplified mobile phone displays of distance and directions for ambient location voice references with CIDs or MLNNs.

For example, finding someone in a crowd can be accomplished by a traditional voice communication of "Jill is at 127.924" that could be read from a phone display as illustrated in FIGS. 24 and 25. The recipient could then use voice input to designate the location of Jennifer at 8721, (and optionally the recipient's location as 7517), and the recipient device can provide a pointer and indicate the distance and direction of Jennifer from Jill and verbally and/or display it on the phone. This MLNN may or may not be dependent on an SA because the MLNN may be based on a global system that is structured so that all MLNNs are unique within certain areas and/or are spaced certain distances apart. For example, in one example, MLNN derived from global coordinate systems 4 and 6 digit MLNN locators are always approximately 100 and 1,000 meters apart. Thus, two parties within 100 meters of each other can use the MLNN to identify, speak, hear, and use their precise location with only a 4 digit numeric MLNN.

In other examples, CIDs and MLNNs will be disambiguated and interpreted through AI and structured systems to consider and iterate on any and all variables known or ascertainable related to the use of the CID, including but not limited to time, location, biometric attributes, identity and history of the speaker, the nature of the CID, the context or nature of the usages, information related to the CID or one or more of the CIDs that are being disambiguated or discarded in the disambiguation process. Disambiguation and interpretation of any CID or MLNN locator can also be based on the identify or location of any Internet entry point of any Device or Network, as defined below, utilizing the voice interface or the path of such communications from the originating or other interface (e.g., 5G antennae, Wi-Fi router or access point, etc.). Such entry point locations may be registered and precisely geocoded to provide micro-locations for purpose of determining SAs, or the SAs may alternatively be defined based upon the use of such entry point such that all users using such entry point are automatically parsed through a specific SA for that entry point regardless of any geographic area associated with the entry point. It is one useful aspect of the system that CIDs can be coordinated with MLNNs or other SAs to automate and facilitate the creation, curation, and use of CIDs.

CIDs can be used for secure, private, demand driven wayfinding, with CIDs used for both originating locations, routing, checking in, modifying or otherwise create a bread crumb trail. For example, a map service may provide voice enable turn by turn directions to a building, but CIDs, MLNNs, and MLNN locators facilitate and expedite drop-offs, parking, wayfinding from public transit, and micro-point adjustments. As an example, in a 5-level basement parking garage, the driver could inform Siri that she parked at 828.101, and Siri would be able to use that reference to know the exact location of the parking space on the 4th level notwithstanding the absence of any other GPS or LPS system. Upon entering the elevator user could verbally indicate she is at 2812, or Elevator 2, and upon exiting the elevator at the 16th floor, the user could use the CID to communicate that verbally to Siri. While this can be accomplished with natural language processing, the brevity, pinpoint precision, speed, and capabilities of CIDs, MLNNs, MLNN and other locators expedites the capabilities of NLP and enables brief, precise, and robust location references and real-time information, services, and communications that are not otherwise available with existing technologies and systems.

Using CIDs to activate Codes by voice enable the use of biometric attributes of the speaker for a variety of purposes, including real-time identity authentication, locational verification, etc. Thus, voice CIDs can be combined with other systems for expedited ecommerce, payments, and other authorizations at the micro-location level. The CID combined with the other information effectively voice enables any QR or other Scannable Code that be used to identify merchant, payment, price, or other payment systems, thereby enabling users to bypass scanning the QR code yet nevertheless activate the actions represented by or activated by scanning such Scannable Code.

Combining the voice CID with the biometric attributes of the speaker, including voice imprint, the location of the Scannable Code, terminal or activator determined by prior registration or located network access, time, date, or other contexts as taught by the systems and methods described herein enable voice activation of such Scannable Code for authorizing a payment. Further refinement and validation can be obtained by verification of the exact amount of the transaction being paid, the voice input device, time and date, precise location of the device, internet access point, and any other information known or ascertainable about the transaction can be used to automatically verify the payment or other commerce authorization. The system can identify the unique CID based on the SA, the identity of the speaker based on biometric attributes, and the date and time and other contexts or information available to the system to verify and authenticate identities of parties to a transaction and the nature of the transactions, including the potential to create and use multiple CIDs and MLNN locational numbers associated with various products or other aspects of any given transaction. Thus, a user might say: "Hey Siri, I want to pay 398-919 $75.12." "Hey Siri, I want to buy 3 items with the SmartPoint Shortcodes of 2872, 8102, 2012, and the total is $27.12, with or without the additional security of a CID or MLNN location identifier, e.g., 812.889."

These simple voice commands and inputs could effectively validate the speaker via biometric attributes (voice) through the spoken CID or MLNN, the entry point of the device being used, the CID of the location/merchant, Activators, etc. of 398-919, and the items being purchased. Any other known or ascertainable information can also be used by the system to validate, disambiguate, and verify any of the foregoing. Any background or ambient noise or other factors may be used to determine any general location or other disambiguating factor, including the identity and last known location of the user, their digital Devices, and information related to the communications those Devices with Wi-Fi routers, cell towers, or other antennae (i.e., 5G, WAAS, etc.) and the location or other contexts thereof (ownership and use of the specific Network, etc.); the system, service, application or even recipient(s) of the CID or MLNN location number and the Codes intended to be communicated; the recent or historical locations of the users, and/or the proximity or other factors derived from or related to their related Devices and movements (via car, bike, etc.).

CIDs can also be used with virtual, augmented, or broadcast proximity, with or without visual cues by correlating the virtual, digital, or broadcast SA (e.g., the program being watched, viewed, or listened to) with the physical SA to further disambiguate any CID based on all known or obtainable knowledge and contexts related to the use of the CID verbally to ensure that the disambiguation and/or activation is exact. For example, as indicated in FIG. 13, if the QR code is displayed in a menu or over broadcast TV or online, the CID for any given Code can be displayed and disambiguated by reference to the actual broadcast being viewed, the broadcast medium, the Devices used, the time of day, the audio associated with the display, the location of the display or the user such that speaking an extremely short CID to activate the QR code can be disambiguated by the AI and system to ensure that the resulting action is exactly the same as that derived from scanning and using the Code. Further, the system can use the CID to completely bypass any viewable Code to minimize the screen usage for the Code and also maximize the speed and efficacy of the underlying voice or other activation.

Voice CIDs can further be activated by numerous viewers simultaneously by voice or data entry without every viewer having to scan the underlying Code. CIDs can be used for specific audiences or presentations. For example, a presenter may display a large Scannable code for members of the audience to view or see certain information on their phone, and the display can include a CID for that Scannable Code or even other alternative Activators and CIDs on the same screen for different purposes. The CID combined with the SA of the specific room for the presentation, combined with the usage time and other information, can be disambiguated by the system to ensure that users access the appropriate content, information, or other communications. Similarly, a CID for a Scannable Code can be displayed on a stadium screen together with the Scannable Code to enable activation by voice of Voice Services and Voice Interfaces. Proximity in time and distance is used by the system to determine the SA and enables the activation of the Code by the voice CID.

Figure 19:
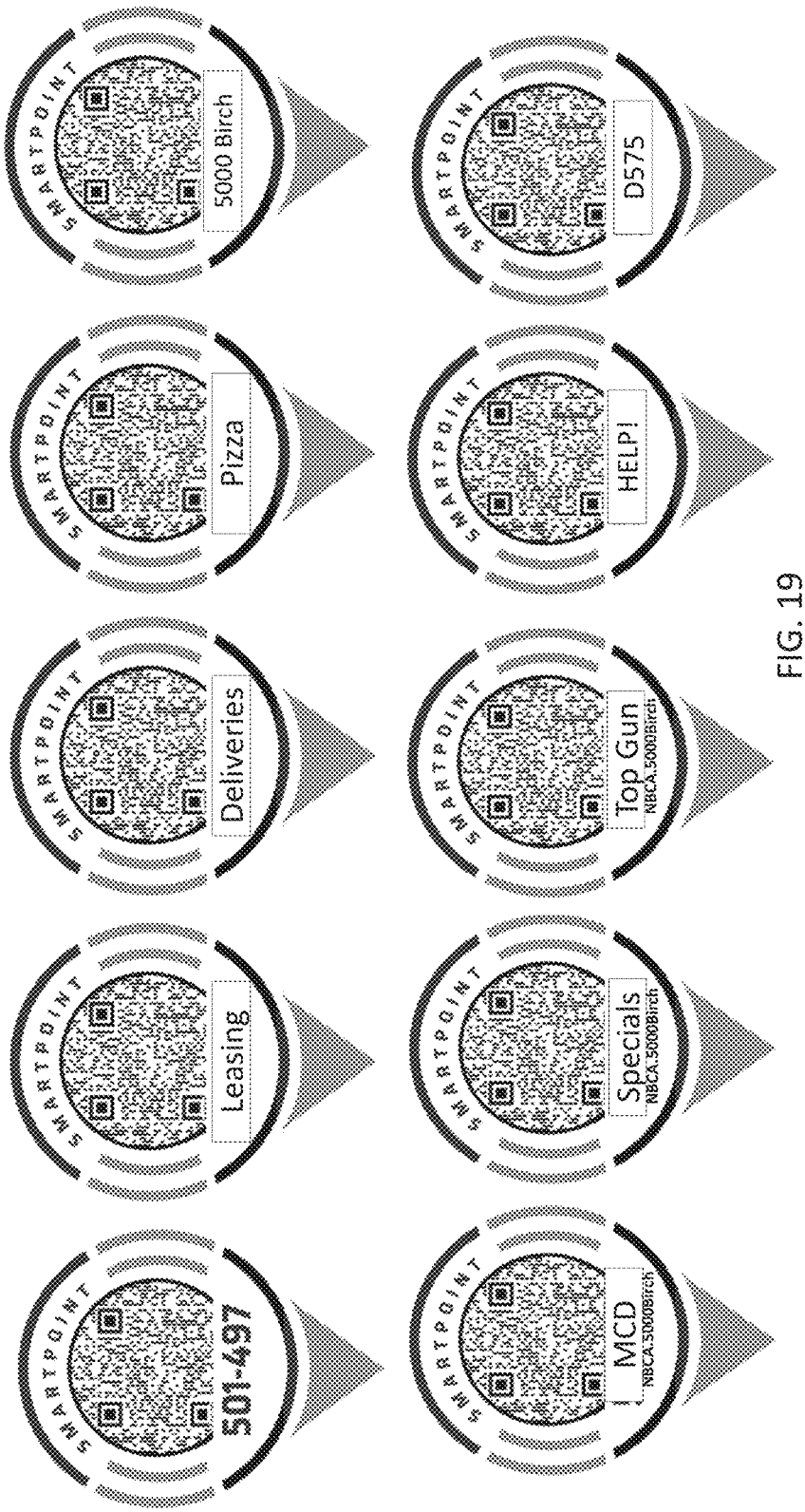
FIG. 19 shows examples of Smart Locators with associated QR codes.

While typically comprised of simple, short numeric strings, CIDs may also be based on alphanumeric strings, or alpha only strings or words, including mnemonic and potentially encrypted strings, that are human readable and easy to communicate. For example, in FIG. 7, numerous Codes and CIDs are displayed such that the user can activate one more Codes by the voice CIDs. CIDs and MLNNs can also use human readable words and keywords that are associated with any given digital or physical SA or multiple SAs and RSAs. Examples are included in FIGS. 7 and 19.

CIDs will typically be static, but they can also be dynamic based on digital or electronic displays with changing Codes and CIDs designed to increase the number of CIDs associated with any given Scannable Code, Activator, or Beacon and can be further randomize or trackable for reporting or other purposes. For example, as illustrated in FIG. 14, a digital clock may intermittently display one or more CIDs that can be voiced by users for any number of purposes to obtain or access any information, wayfinding or navigation assistance, deliveries, rideshare, current or historical conditions, emergency, or other services, etc. CIDs do not have to be associated with Codes and can alternatively be used via voice to bypass such legacy systems completely, yet nevertheless provide an alternative voice activated or BCI methodologies to provide the same breadth of digital information, services, etc. that are typically provided by using Codes today and in such legacy systems.

While the use of CIDs and MLNNs is easier in smaller and more discrete physical SAs and RSAs, the system will work with larger and broader non-physical SAs and RSAs. For example, a radio broadcast can utilize a short CID, and despite a substantial physical broadcast area, the relevant non-physical SA can be based on the exact broadcast such that the system can disambiguate the listener subsequently using the CID to be associated with the SA of that specific broadcast. Thus, the publication of the CID 7234 could activate a specific action directly related to that specific broadcast over any Voice Service enabled with the system and such uses and activations can be readily tracked to that specific broadcast based on location, time, and even broadcast proximity.

CIDs, with or without MLNN locators, will be extremely useful in hospital environments for tracking assets, patients, visitors, Doctors and other providers, locations, wayfinding, and providing healthcare services, including: 1) assisting patients and visitors navigate often extremely complex buildings, complexes, facilities, parking structures, treatment, and diagnostic facilities, etc. 2) assisting doctors, nurses, and staff navigate and/or report locations, request services, or otherwise interact with each other and the facilities and Devices, and 3) tracking the various medical and other assets, fixed or moveable, that are often very expensive and typically portable in and around the hospital. All devices, rooms, and other areas for any given SA can have highly visible discrete CIDs and MLNN locators associated with wayfinding, room numbers, and other signage to facilitate quick and easy verbal location referencing in lieu of or as a back up to very expensive automated tracking systems with indoor positioning systems, beacons, etc.

Such CIDS and Codes can enable users to access real time information and communications, including emergency services or instructions for persons during emergencies. For medical staff to track assets, patents, and even medical staff locations and times for billing and other purposes, medical staff could abbreviate their communication for logging a patient move to something like "Taking 1298 from 2432 to 9381", where 1298, 2432, and 9381 are CIDs associated with Codes on a patient's wrist and on a sign in the origin and destination rooms, respectively. The system can also provide verbal feedback for verification or further communications, and such feedback can be in the form of the CID or MLNN locator or an expanded or enhanced version with additional descriptions, information, instructions, etc.

CIDs can be based on any existing numbering and referencing systems for rooms, office, or other areas for any given project or property, although in many cases there are advantages to using other CIDs and MLNNs for any given SA. CIDs are associated with Scannable Codes and neither CIDs nor MLNNs are intended to replace traditional room naming, numbering, or other systems. CIDs can be selected, registered, maintained, curated and used with optional encryption and privacy. Advantages of CIDs include interoperability across disparate systems, case of creation and management, abbreviated and standardized referencing, awareness and familiarity with all users and visitors (especially those unfamiliar with the existing systems), anonymity, optional geospatial cognition for humans and Devices. Further, standardized CIDs and MLNN locators facilitate interoperability with spreadsheets and other software, including databases, programming languages, GIS, voice and other inputs for the creation and management of MLNNs and CIDs, as well as systems and methods for interoperability across numerous services. Finally, CIDs and MLNNs are also intended to be multi-lingual by focusing primarily on the limited set of numeric characters and limited alpha numeric characters rather than words in various languages, although nothing prohibits creators/owners from using keywords or other terms as MLNNs and CIDs for any given SA or RSA.

CIDs can be displayed anywhere-highway and building billboards, signs, out of home displays in airports, shopping malls, kiosks, mobile vehicle displays and wraps, etc., and used to activate Codes and provide enable users to voice precise location identifiers for locations, specific information, activations, devices, services, etc. The voice CID locators will be easily recognizable and easier to use and remember than URLs and other existing keyword systems, because the system can interpret and disambiguate extremely short voice references based on the combination of various system and methods for SAs including those taught herein.

CIDs can be associated with any physical sign in a manner similar to Scannable Codes and Activators, kept short but nevertheless resolved by SAs and RSAs, and can be, together with images of and/or the information on or related to the underlying sign, registered in a discrete or global sign registry and clearinghouse, and accessed digitally via text or other means through a central repository system designed to effectively digitize any registered sign and provide the exact MLNN locator number for the sign and provide instant access to all information on the sign plus additional information, services, and communications relevant to the sign or location.

Figure 8B:

As illustrated in FIGS. 15, 18, 24, and 25, CIDs and MLNNs may also be displayed on digital global, local, or even highly customized digital or printed maps, floor plans, PDFs, geo-enabled PDFs, guides, VR, AR, BIM, or other displays, images, headsets, and other Devices and visual or audible references, with or without Scannable Codes and other Activators, to reference specific Devices Scannable Codes, or Activators to enable voice activated navigation, interactions, or other activities. As indicated in FIGS. 8A and 8B, CIDs and MLNNs may be added to or integrate with all types of existing Devices (clocks, thermostats, Smart switches, lights, smoke, carbon, heat or other detectors or alarms, voice input Devices and remote controls like Echo Dot, Chromecast with Google TV, other remote controls etc. (Sec, e.g., FIG. 13) or new Devices without or without digital displays.

CID displays, containers, and related Devices may be powered or not. For example, a digital clock can be designed to alternatively display the time and a short 4-to-6-digit CID or MLNN locator to identify the room location or digital activator. Users can then voice that short CID or MLNN locator to communicate with anyone or any Device with a Voice System the exact micro-location associated with that CID and/or Scannable Code or Activator. Users can thus access information, services, and communications related specifically to that exact location identifiable by the CID or MLNN locator.

CIDs and MLNNs essentially provide a new universal language for activating location specific content and services by providing an easy capability to communicate precise locations and/or activate exact digital content or interactions. CIDs are short and can even be limited to a simple 10-digit numeric character set, which facilitates usage across numerous languages and dialects such that CIDs could become a lingua franca for anyone anywhere to reference precise locations in any language to trigger precise location-specific digital interactions via voice, BCI enabled, or other interfaces.

Importantly and advantageously, Devices using CIDs do not need specific and precise indoor positioning system with NFCs, Beacons, or other methodologies which are often expensive, require downloadable applications that track users and thus consume CPUs and battery power and raise privacy concerns. Because CIDs activate underlying Codes for content, CIDs can communicate or be used to access infinitely precise location and device information to provide 100% room and even more granular location accuracy. A CID associated with a specific Code can provide infinitely precise information on the location of the user activating the Code.

Figure 18:
FIG. 18 show exemplary uses of stand-alone CIDs and with exemplary devices for numerous purposes and categories of information, services, or communications, including CIDs comprised of topical keywords, brands, abbreviated addresses, and shortcodes and exemplary services that can be accessed by CIDs over Voice Interfaces and Voice Services.
Figure 20:
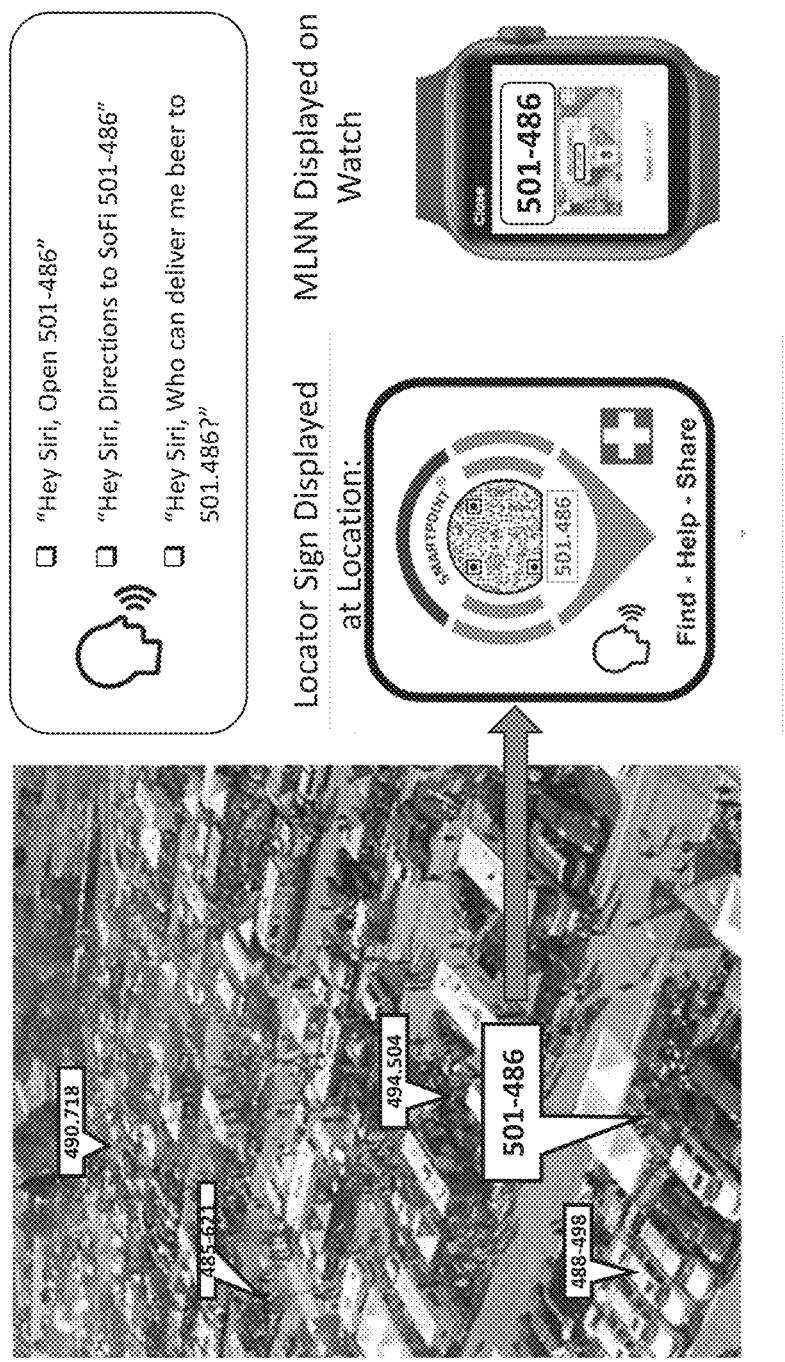
FIG. 20 shows an exemplary use case using ambient voice location referencing and CIDs to activate Codes and/or access micro-location specific information, services, and communication for ordering products and services in an open area such as a stadium or other venue, including delivery by Drone to MLNN or CID locations.
Figure 23:
FIG. 23 shows examples of persistent displays of real-time MLNN ambient micro-location referencing on GPS navigation devices together with simplified displays of distance and direction between locations using ambient micro-location voice references.

A user may log, track, or communicate CID and MLNN references to one or more systems, and the enabled systems can display or voice such CID or MLNN references to others used in AR, VR, or other headsets or displays, e.g., as illustrated in FIGS. 15, 18, and 20. Such references can be derived from a global public domain location or CID reference system, an egocentric or custom system that is still publicly available, or they can be encrypted or even scrambled for some or all participants. Encryption may prove particularly helpful for law enforcement or security or military operations where participants where privacy and secrecy for verbalized or audible communications is desired.

In the context of a digital Devices, e.g., a clock or other Device with a digital display, the displayed CID or MLNN can be controlled remotely and programmed for many specific uses. The CID or MLNN can be discrete for every micro-location within an SA, or it can be identical for every location in any given SA or other area. It can vary with different audible messages to identify the message or optional action suggested by the audible or visual message or communication. For example, in an airport with 100 digital clocks or display advertising screens located throughout the terminals, the CID can be unique for every display at every location, or the CID can be the same for the entire airport to indicate certain services, or the same for any given terminal or gate or other area.

As another example, CID or MLNNs displayed in a large stadium, arena or convention center could similarly be unique for every precise location of any display, (e.g., a unique Scannable Code and CID for every seat in the stadium) or they could be used for various areas or types of areas. Every seat in an arena could have a unique CID or MLNN, which can be a simple string (e.g., 9391, or it can be a derivative of the actual section, row, and seat (e.g., S221, A46, S143 or even 2214.6143). The MLNN or CID can be inherently geographical to facilitate pinpoint referencing to any very small area in or near the SA. Further, the CID or MLNN can be random or encrypted, or they can be based on various Coordinates System. For example, when ordering for delivery to a specific seat, using and encrypted MLNN or CID eliminates the risk of others overhearing the seat location while effectively communicating it to the delivery service. At the counter one could say, "Please deliver to 8382 to ensure that anyone overhearing the order could not hear or learn and interpret the seat location" CIDs and MLNNs have the benefits of being inherently private and obscure in the absence of the SA and contexts or other information to resolve them.

Figure 17:
FIG. 17 shows exemplary use of CIDs to access rideshare services by voice in connection in connection with physical and virtual signs preset pickup and drop-off locations and to access price, time, and service information and comparisons from or to precise designated micro-locations related to CIDs and MLNNs for precise micro location references in and around such pre-designated rideshare pickup and drop-off locations.

CIDs and MLNN locators, with or without CIDs for specific SAs, can be used for delivery and rideshare services to reference by voice or otherwise specific locations in areas that are otherwise not capable of precise descriptions, designators, or identifiers. For example, for deliveries on the beach, at a large pool, or in a large park. MLNN locators or CIDs can be associated with SAs related to specific bus stop, RideStop® or other identifiable location or area to enable extremely precise location references and navigation/wayfinding relative to such known location. FIG. 17 shows a Code and associated CID displayed on a specific sign for a specific pickup and drop off location. For example, a rider or driver could say "I'm 3621 at RideStop Santa Clara Square 1", and the MLNN locator 3621 would identify the exact 2 or 3D location near the designated RideStop No. 1 with the precision of a few feet, including level, floor, or elevation. MLNN locators are designed to work anywhere in or near the SA.

Figure 9:
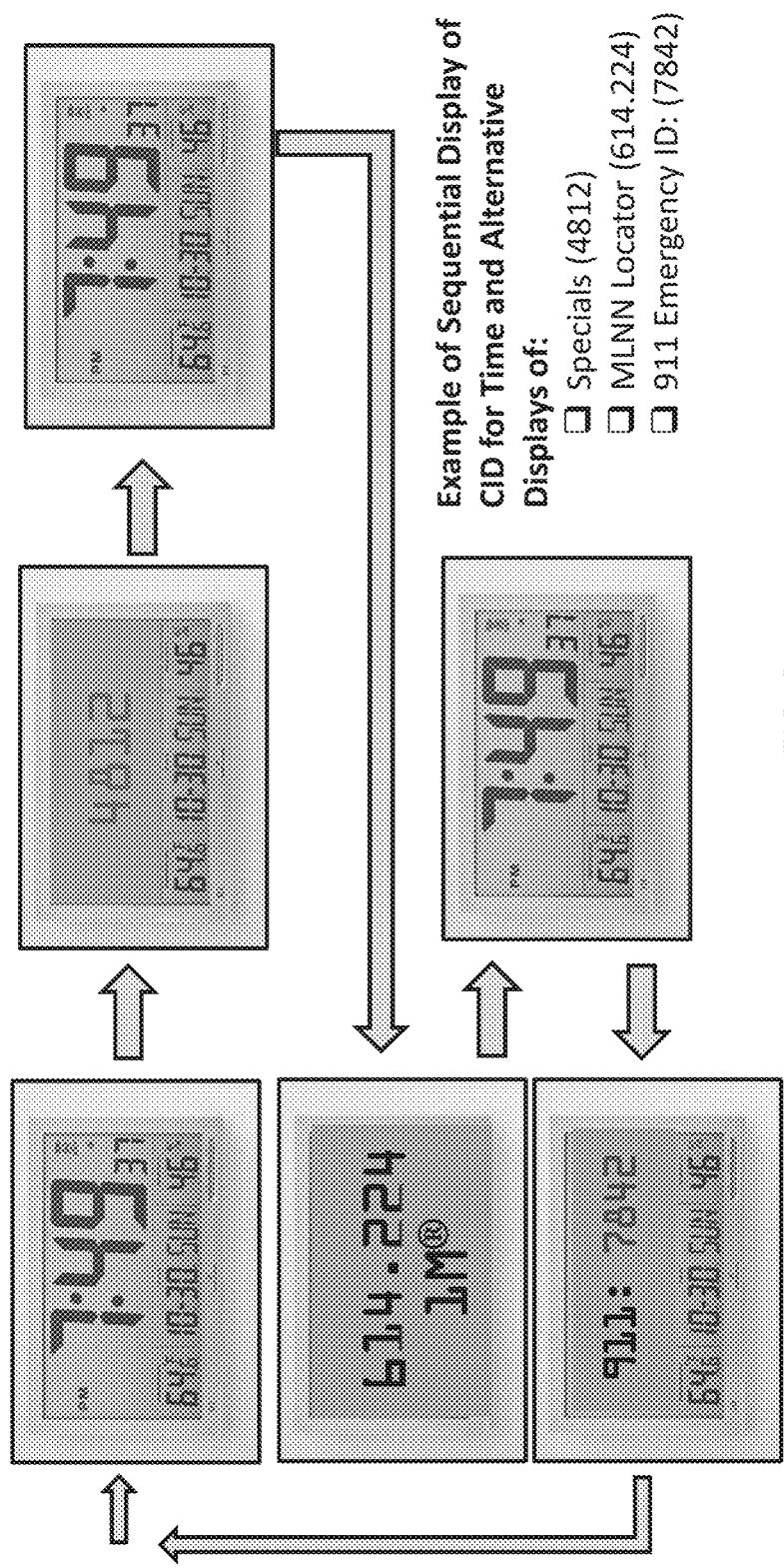
FIG. 9 shows exemplary displays of CIDs with a representative clock face including other location specific information for various purposes in an alternating display on a digital device with CIDs activating different Codes or functions.

CIDs and MLNNs can use any punctuation system, font, style, or other design for display to enhance human cognition and voice and other usage, yet can be ignored for processing purposes. For example, alpha and other characters and keywords or descriptive words that may help end users can be used and functional, informational, or other purposes yet visible but ignored in the operation of the system. CIDs and MLNN locators can be alternatively based on various Coordinate Systems. For example, usage may be normally based on a global or broad area allocentric Coordinate System, but instantly changed to a hybrid encrypted or hyper-localized egocentric system based on some event or situation (e.g., a lock down active shooter environment). Displays can also be color coded or otherwise distinguishable for various purposes as illustrated in FIGS. 9 and 10. For example, CID or MLNNs could be displayed green when things are normal, red, yellow, or orange if there are safety or other concerns, or blue or purple to indicate some new special or piece of information associated with a CID or MLNN. CIDs can also reference remote locations.

For example, if a commercial or residential property is powered by or associated with remote solar panels for purposes of powering the facility with green energy and the owner/operator wants to associate the property with the specific solar panels (on the building or positioned remotely) owned by or otherwise associated with the property owner that directly or indirectly powers the property with solar energy, the CID can reference and capture content or activities (e.g. opening a website with relevant content and information) related to the exact location of the solar panels, including satellite or video images of the facility where the remote solar panels are located together with indicators of ownership by the owner. Such content activated by the CID can also include access to a data vault, ownership, data and other information, historical or current, even real-time, related to the location of the CID or Code.

Figure 7:
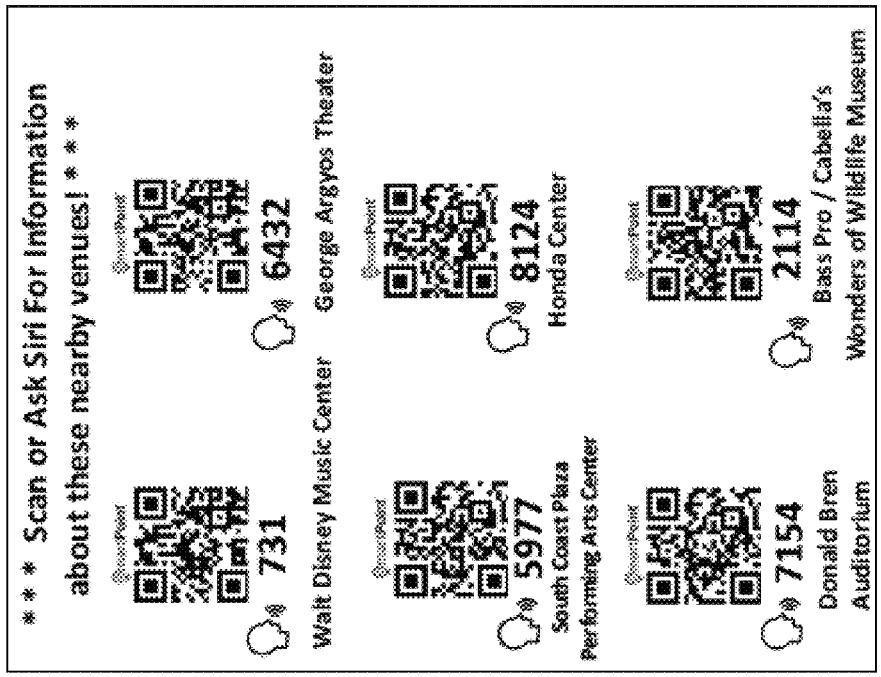
FIG. 7 shows multiple exemplary locator signs displayed in close proximity that contain discrete Codes and associated CIDs to enable uses to elect and activate one more Codes by voice.

CIDs can also be used for any check-in, queuing, waitlist, entry, or other similar mechanic by enabling users to merely use the voice CID to trigger the associated action. For example, a user might say, "Hey Alexa, please check me in at 9819" after viewing a Code with the CID 9819 at a specific restaurant where the user was visiting, or even merely "Hey, Alexa, 9819" to check in at a particular place or activity. As illustrated in FIG. 7, destinations might display multiple CIDs for disparate check in or other actions or information. For example, a medical imaging facility might display the CID 9819 X-Ray, 8728 CT, and 9812 PET in an entrance sign to enable visitors to check in or obtain directions, information, etc. for the appropriate procedure or activity. Upon use of the voice CID for any of those destinations or activities, the Code or system can provide precise real-time information or directions, including augmented suggested paths and turn by turn directions to such facility, including displays similar to the exemplary displays in FIGS. 26 and 27. Similarly, users might simply use the displayed CID and "Hey Open Table, 8298" to check in at a restaurant in an automated check in system. Such CIDs may be operated with Scannable Codes, Activators, and Devices, or they may be used separately from and independent of such other mechanisms in a voice or other input mechanism. Using MLNNs for checking in can also add some proof of the location of the end users to avoid remote check ins.

An important use of CIDs whether or not integrated with MLNN locators is for emergency and other similar situations, where there is an intense and unusual need to communicate with numerous persons in numerous locations.

Further, emergencies services need fast and precise location information and methods to communicate with end users in any given area in the event of an emergency. One or more simple MLNNs could be verbally broadcast to all officers to designate any location in or near the school with a simple 4 or 6 digit number, and the number can be encrypted if desired. This is largely today an unfilled void for ambient precise location referencing, and the system of CIDs and MLNN locator is designed to meet that need.

For example, in a recent mass shooting at a school, there were over 360 law enforcement officers that arrived near the school within an hour or more after the incident began, and CIDs and MLNN locators could have been used to enable victims, calling 911, officers, and others to reference precise locations.

The CID could be used to open a live application or mobile web page with real-time information, communications, or instructions or otherwise identify the precise room and location. While at some point certain officers or others may have known or learned that victims and/or the shooter were in Room 112, absent a floor plan and schematic of the structure it is very likely that the other 360 officers would have no idea where room 112 was located. The MLNN locator of 8381 could be broadcast to the officers and they would be able to display that location on a device or other display with a verbal command like 'display 8381'. Further, the system is designed to facilitate AI, ML, and large-scale implementation that can be broadcast discrete messages and instructions to numerous users and locations instantly. Per voice or text communications can quickly and precisely reference multiple locations (hall way doors, exterior windows, two entrance doors or door to one or more interior closet) each with discreet MLNN locators to instantly verbally identify the precise locations of those doors and other critical points. Further, teams of emergency responders can use CIDs and MLNNs to reference precise locations. Or perhaps the verbal instructions are something like: "A, B, C and D officer position at 8381, enter at 8212, and proceed to the door at 8153. X, Y, and Z officers' position at 5124, enter at 6272, and proceed to the door at 7632. The brevity, precision, and interoperability of the MLNN locator would enable all of the 360 responding officer to hear, communicate with each other or a device, and see on a Voice System the precise pinpoint locations represented by the MLNN.

While the likelihood of such emergency is very remote, the system is designed to generate everyday usage, awareness, and efficacy through more routine, recurring, day to day ambient location usage for deliveries, rides, wayfinding, servicing, asset management, meeting friends in a crowd, getting routine help or directions, etc. Thus, users will become familiar with the system as second nature so that it is available and familiar if/when emergency use cases arise.

By combining CIDs and MLNN locators with detailed specifications and pre-assigned routing and facilities data and information, together with AI-enabled decisions and communications, emergency facilities systems could simultaneously broadcast, or provide on demand through the unique CIDs and MLNN locators, specific micro-location routing and information for every single location, even a classroom, bathroom, or closet in a build or even larger project or development other similar project, and such instructions could be instantly customized for the type and location of a threat and broadcast or request through or with the MLNN locators. For example, persons sheltering in place near an active shooter on campus could be instructed to remain in place for extrication, while others further from the incident who are sheltering in place could be told to exit the structure and proceed along a route that was considered safe. Users could access the service via 9-1-1 and communicate their location with an MLNN such as "there are 6 of us at 187.221", and an operator or an automated response. And CIDs can activate information solutions that provide real time active customized instructions at scale simultaneously to hundreds of persons based on their exact room location, with 100% room level accuracy because the CID and underlying Code is correlated to a room or even a sub-location in a room.

As another example, in an active shooter situation in a stadium where every seat and other micro-location had a unique CID or MLNN locator, the system could effectively instantly broadcast via text, notifications, or some other means discrete messages and instructions to every person who accessed the information with the custom CID at their seat and provide each person with unique, customized, and optimized instructions and other information. User 1 who says, "I'm at 9312" might get an instruction to stay in the bathroom until further notice and User 4 who says, "There are 8 of us at 6123" might get an instruction to evacuate that suite on the 4th floor and exit the adjacent stairwell and leave to the south. CIDs and MLNNs combine to enable the system to have discrete pre-determined responses for every location to various situations in advance and activate the relevant responses for everyone accessing the information and providing any unique CID and thereby provide completely discrete and optimized instructions based on every unique location in the facility.

SAs, CIDs and MLNNs can be created, stored, managed, sold, leased, traded, and otherwise controlled by a centralized registry, registrars, or owners with a thin registry of core attributes of SAs, CIDs, etc. for any given area. The CID, SA, Brand, Keyword and other registry and clearinghouse databases (e.g., shown in FIGS. 4A and 4B) can utilize blockchain, non-fungible or other tokens, or any other system with centralized, decentralized or distributed ledger mechanisms to create, manage, resolve, track, and monetize usage. The registry, clearinghouse, or decentralized distributed ledger systems can be represented by fungible, non-fungible or other tokens to facilitate ownership, control, and transfers throughout the world or relative to any given SA or other area.

CIDs and MLNNs can be an integral component of an ad-serving engine based on CIDs, proximity, devices, time, users, etc., particularly with respect to voice enabled and/or voice-only systems, and the CIDs, MLNNs, and MLNN locators enable extremely precise (indeed infinitely precise) geotargeting via user, subject matter, time, and context targeting of advertising and related information or vendors based on the exact building, room, hallway, or other defined locations as well as undefined micro-locations in or near any such property, project, building, room, etc. CIDs and MLNNs enable 100% room specific advertising, messaging, PSAs, or any other communications and can be further customized to the precise recipient of the message. If Person A, who is an employee of the law firm where the conference room is located, uses a CID to access room-specific information about the room, they will likely see customized information that is different from the customized information that is seen by using the same voice CID by Person B, who is a visitor from a foreign country and therefor likely has different interests and needs.

The locator number could also be displayed on a nearby building or by a painted reference on the tarmac, sign, or other display, whether in a restricted area or not. Similarly, CIDs and MLNN locator numbers could be used for any transportation referencing, for example, ships or other vessels in a harbor or on loading docks, trucks or trailers in a loading yard, train engines, cars, or other components in a railway yard. Importantly, while the CIDs and MLNN numbers can be determined and based on any given SA or RSA, the human to human and human to machine, and even the machine to machine (AI enabled or not) interfaces can be identical for optimized familiarity, efficacy, and usage. This facilitates training, awareness, and efficient and effective usage while minimizing user error and enhancing interoperability across disparate Devices, systems, and software.

CIDs may also consist of Brands (as defined below), or other Keywords (as defined below), and such CIDs may be owned, controlled, registered globally or for specific Subject Areas and represented by tokenized ownership much the same as SAs as described herein. As used herein, the term "Brand" includes any term that may be used by the Brand and Keyword Database in FIG. 4A to uniquely identify a product, good, service, or function, non-fungible token ("Token") or other key identifier, a trademark; a service mark; a trade name; an individual's name (e.g., of a celebrity); an organization name; a geographic name or name of an SA, such as a state, city, project, campus, or community; a fictitious name; a product or feature name or pseudo-name; a moniker; and similar names used to associate such items. Also as used herein, "Keyword" includes any term that may be used to provide a trigger, categorize, and/or prioritize Search Requests and/or Search Results, such as categories of products specific product names or types, geographic descriptors, temporal descriptors, and similar key words and phrases.

For logistics and transit or other navigation and wayfinding, MLNNs and CIDs can also be used to designate an original destination, or even paths. For example, Delta Jet N9898T, proceed from 711.441 to 985.325 via 145.775, 579.478, and then to 945.325. For controlling drone paths, small custom 2D and 3D SAs can be defined in order to minimize the digits necessary to reference precise, discrete locations in or near the SA. For example, a newly created SA around a football or soccer field could use a 4 digit MLNN locator to describe the desired location of the drone camera and the desired area to shoot with the camera: "Fly to 1877 and point the camera at 1126", which could effectively identify both locations with 3 ft. precision, making it easy for anyone to designate one more drone positions for pictures as well as the intended focus of the image.

CIDs and MLNNs can be used in interactive 2D and 3D imagery and video such as home, office, or building tours to reverence any preset or other location inside the video. In an AR, VR or other visual display environment, CIDs, MLNNs, and MLNN locators can be affixed and associated with virtual or physical Codes affixed to walls, signs, products, Devices, etc. to enable users to verbally identify such locations, items, codes, etc. as they use headsets or other wearable displays for navigation, packing and shipping, indoor or outdoor construction, etc. Further, the CIDs and MLNN locators can be generated by the system and overlayed onto the real-world visuals and seen through Smart Glasses, AR and VR headsets and other wearable displays, etc. to enable users to verbally identify and reference locations with each other or devices to access information about, obtain directions to, or otherwise interact with such location, object or Devices, activate Scannable Codes or other Activators, or identify and/or otherwise interact or use such identified location by using the voice CID or MLNN.

For human navigation, CIDs and/or MLNNs can be used to identify the exact location of every building exit and other signs of all types, whether inside, on a trial or pathway, or any other location. Such identifiers can also be used to designate paths and ultimate destinations. For example as illustrated in FIG. 16, an Exit Sign may display 4125□4781 to indicate the exact location of the sign (4125) and the actual intended exit point and destination (4781). Such displays can be static or dynamic such that the system can automatically change the actual intended exit designator (e.g., in this case, from 8471 to, e.g., 6232) based on real-time information dependent on the exact reason for the exit and optimal pathway to minimize risk and avoid additional injuries or problems, or to optimize traffic flow to avoid obstructions, bottlenecks and optimize outcomes. Users could then see and voice their location or exit path to their Siri, Alexa, Google Assistant or some other voice interface which could then provide voice or visual turn by turn directions from the exit location (8398) to the designated destination (e.g., "Hey, Siri, there is an emergency in progress. Please give me directions from 8471 to 6232.") One advantage of this system is that users are not required to be sharing information with others for the system to work. It is not necessary to drop or use a physical or digital pin, but rather can identify the price location with only a verbal, spoken reference, essentially enabling a voice pin as an alternative to visual or digitally transmitted pins. Voice pins also enhance interoperability across all Devices, Voice Services, and Voice Interfaces with a minimalist language and reference system for all HMI Interfaces. The CIDs and locators can work with completely autonomous systems and Devices because of the expedited input and precision of the locator and CID and MLNN references, whether pre-registered or determined by the RSA for any given SA.

Examples and Additional Features:
  a. Using AI, ML, BCI, and NLP to recognize and interpret CIDs to facilitate the operation and enhancing the definitions SAs via a crowd-sourced data feedback subsystem for purposes of capturing, curating, and continuously iterating and improving the system of CID and MLNN micro-location referencing and associating CIDs and MLNNs with fixed or variable SAs.
  b. Using AI, ML, and NLP to capture, store, associate and disassociate, disambiguate, and progressively learn from actual use of CIDs to improve and update CIDs, including monitoring and analyzing subsequent use and feedback from end users regarding the information, services, etc. that are accessed by the CIDs.
  c. Generating iterative and adjusted formal, informal, colloquial, and other feedback regarding information communicated with, but ancillary to the actual CID, or associated names for MLNNs. For example, the system may learn that users may often make different references to the exact same MLNN at the exact same building. The following examples show uses of the same CID or MLNN for the same building referred to in many different colloquial ways and aliases by different users:
    i. "Hey Siri, please send me the SmartPoint link 8234 at the Wells Fargo Bank Building.", ii. "Hey Siri, please send me the SmartPoint link 8234 at 4590 MacArthur Blvd."
    iii. "Hey Siri, please send me the SmartPoint link 8234."
    iv. "Hey Siri, activate 8234 at NBCA.4590MacB.",
    v. "Hey Siri, please deliver the pizza to 8234 at Billy's Office.", vi. "Hey Google Voice, please send me the SmartPoint 8234 link at Jones, Smith and Day law office conference room.",
vii. "Hey Alexa, please send the presentation and display it at device 9332." [9332 is the CID for the 72" TV in the 8$^{th}$ floor main conference room at the Jones, Smith and Day law firm], and
viii. "Hey Alexa, please let me join the text chat room box for 8234". (access to chat rooms and other similar communications interfaces can automatically be based on limited proximity and/or use of the CID,
ix. "Hey Alexa, please send me the manual, user guide for the computer display at 9201 at the Wells Fargo Bank Building.",
x. "Hey Siri, please show us the options for ordering and having pizzas for 8 people delivered to SmartPoint 8237 by 12:30 today?" Note that the Code accessed by this CID can provide highly customized information for this specific room or location. For example, providing a list of pre-approved vendors that are immediately adjacent or nearby this location and that have access to the building or otherwise. Automatically providing the vendor and delivery services the detailed routing and other pinpoint and customer delivery instructions to expedite the deliveries, etc.
xi. "Google Voice, please enter me in the contest associated with SmartPoint locator 2981.",
xii. and
xiii. "Route Tracker, I just passed NFC 9123 but can't get close enough to activate it. Please do so".

In many of the foregoing examples, the same or different CIDs can be used and colloquially associated with the same building or location described numerous ways, or it may be used without any such reference at all because of the systems and methods taught herein to ensure discrete disambiguation of the CIDs and MLNNs through various systems and methods to determine the relevant SA, including general location, Network identification and other systems and methods.

An advantage of the CID over Scannable Codes is the ability for numerous users to see and use the CID at the same time without having to be close enough to scan the Scannable Codes. The system uses NLP and AI to disambiguate and/or enhance any such references. The same CID can also be used to activate a specific service or various services and for various use cases to access the same or similar content, information, services, communications, etc. that would be activated had the user used a Code as they are designed and are being used today. However, users are not required to actually be close enough to scan, touch, or otherwise follow the precise activation techniques generally associated with QR and other Codes, NFCs and other similar Activators, but are able to do so simultaneously via voice enabled systems of all types, including AR and VR glasses and other similar Devices.

The system enables users to trigger such activations, information, services, and communications by mere voice references to the CID or MLNN. Further, because the CID is short, it can be displayed and printed in larger characters to make it easier to read from a distance, and in fact can facilitate placement very low (e.g., for maximum visibility during fire and smoke) or very high on a wall (e.g., to ensure visibility over a crowd) in locations that would be inaccessible or impractical for Scannable Codes. Similarly, persons with physical disabilities who could not otherwise get close enough to scan or activate a Scannable Code or NFC could verbalize the CID to access the related information through Voice Interfaces and Voice Services or even BCI enabled systems.

CIDs with or without Scannable Codes can also be placed on, registered, and associated with any fixed or portable Device as a quick and easy shortcut way to reference the Device, and the CIDs can be utilized as MLNNs, e.g., as taught in U.S. Pat. No. 10,956,457, the entire disclosure of which is expressly incorporated by reference herein, and other related patents to enable the real-time, micro-location referencing, information, use and payment systems, services and communications and real-time permission-based privacy systems described therein. Further, any Serial Number, UUID, MAC Address or any other number associated with a Device can be referenced with a CID by a few of the characters or numbers that can be easily read, input, or communicated by any user. The last four digits of any such alpha-numeric string could be larger and differentiated to indicate they are the CIDs for such Serial Number, UUID, etc., e.g., as taught in U.S. Pat. No. 9,372,934, the entire disclosure of which is expressly incorporated by reference herein, and other related patents.

Thus, users of a long UUID or other identifier could identify and easily use voice input to select or otherwise use the identified CID for that device if it is within an associated SA. Then, the various system and methods taught herein enable the system to disambiguate that short CID to determine, access, or communicate the full Serial Number, UUID, MAC or other address relative to that Device by using other information (the type of Device, location, owner, etc.) known or obtainable by the system. This can be accomplished by a prior registration of the Devices or any or all of such numbers, access by a Scannable Code or Activator, or any other means such that the user input of a discrete CID can be disambiguated and associated with the exact Device, location, Network, number, or other identifier or information related to such Device, location, number, etc.

The brevity of CIDs and MLNNs are particularly helpful in the emerging field of BCIs. By reducing the length and characters necessary to designate or activate Scannable Codes and Activators and Scannable Codes by voice as much as possible, BCIs and related communications can be shorted substantially and optimized and more effective than NLP and other subjective language usage and descriptions of actions or activities, information, and communications, especially for discrete identification of specific and highly relevant proximate locations or Codes.

Because CIDs, and MLNN locators are very precise and associated with very small geographic areas, including building and even floor or office specific, the methods and systems are particularly efficient for edge computing and proximity based interactions within SAs and other smaller designated areas, including buildings, stadiums, arenas and other distributed computing and information environments for reduced latency and increased security for high-volume IoT devices operating in and around such SAs and other areas.

Because one of the primary methodologies used by the CID system to disambiguate and enhance CIDs is based upon micro-locations, the system incorporates CID assignment, checking, and adjusting features to better apply location and proximity disambiguation. For example, in order to ensure that CIDs are discrete within any given physical, digital, or broadcast location, building, project, SA, RSA, or other defined or non-defined areas, the system uses AI and other techniques to reduce or eliminate conflicts for the CIDs in any given SA, including systems and methods to permanently or temporarily change, reassign, add digits or characters, or otherwise disambiguate CIDs vis a vis the location and proximity relative to one or more SAs.

FIGS. 1A and 1 show exemplary processes that may ensure that CIDs are unique within various SAs by comparing requested or assigned CIDs to existing SAs, enabling creators to request specific CIDs and various options to achieve uniqueness within any given SA, and various methods of assigning CIDs. CID, and MLNN references can be infinitely precise, even to or less than one millimeter, whether such precision is designated in the case of CIDs or determined automatically in the case of MLNNs.

CIDs may include short alpha or alpha numeric triggers, or Keywords designed to help users use CIDs for various purposes, and CID keywords can be operated in a manner similar to online and mobile keyword searches, with or without traditional legacy search results. For example, a keyword or keyword descriptor of Pizza 9122 can be displayed such that users could say, "Hey, Siri, Pizza at 9122" to order pizza to be delivered to the location associated with Pizza 9122. Merchants or other providers could then bid on the Keyword Pizza for any given CID or SA and/or the combined Keyword Pizza within multiple SAs or RSAs in order to be the primary results or included results obtained by users through the voice or other systems. In this regard such merchants or other providers would likely focus on proximate CIDs near their vending area, and the system will have many advantages to automatically enhance the use of Keywords and other CIDs for proximity based searches to reduce the friction of time and distance between the user and the provider of the desired products, services, information, or communications. The keyword bidding can also be based on delivery areas, buildings, and even rooms based on specific CIDs or MLNNs, or based on general areas, SAs and RSAs for deliveries to or from any given area.

Figure 4A:
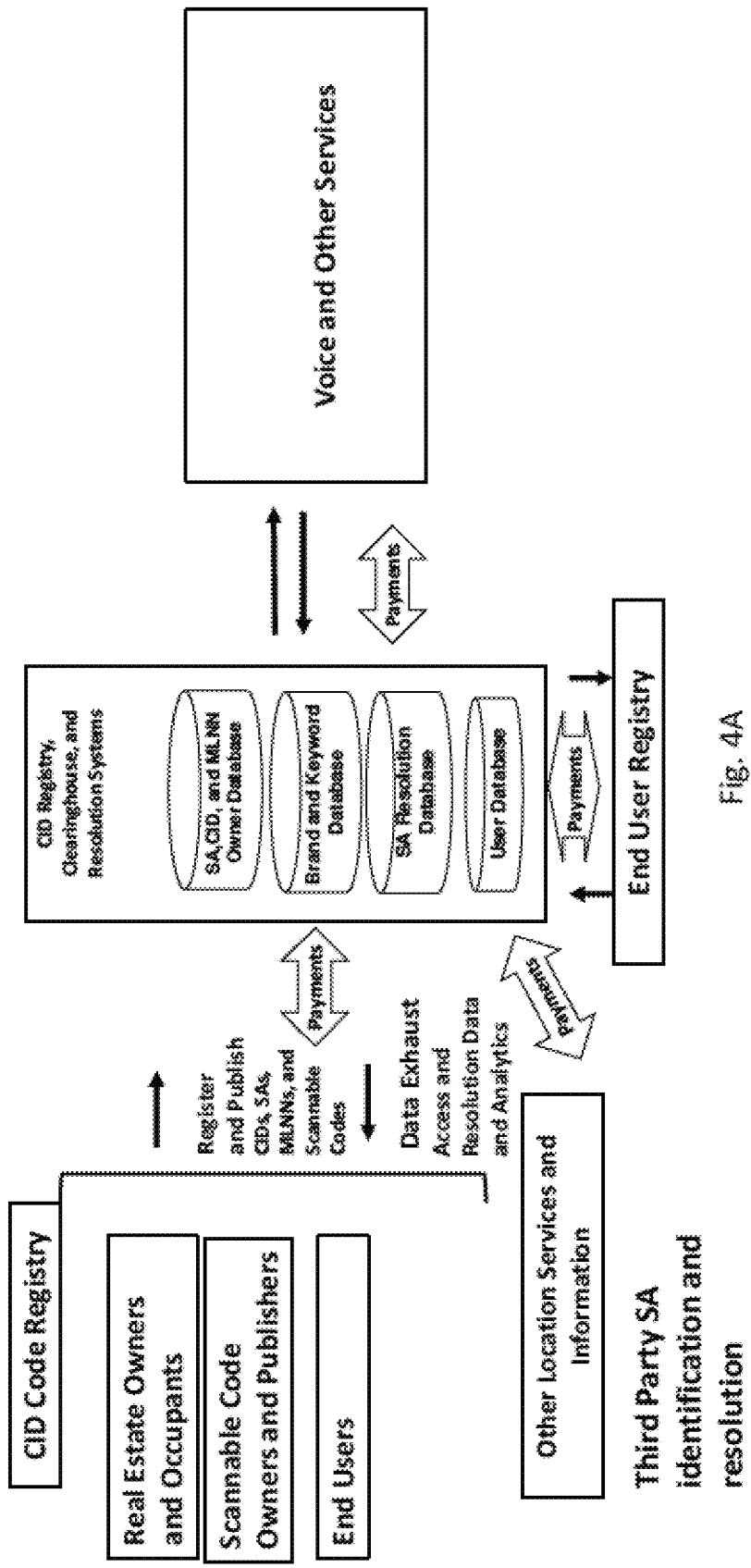
FIGS. 4A and 4B are schematics showing exemplary blockchain and other components of a system for CID, SA, and MLNN registering, creating, parsing, resolving, and paying components of the systems and methods herein.
Figure 4B:
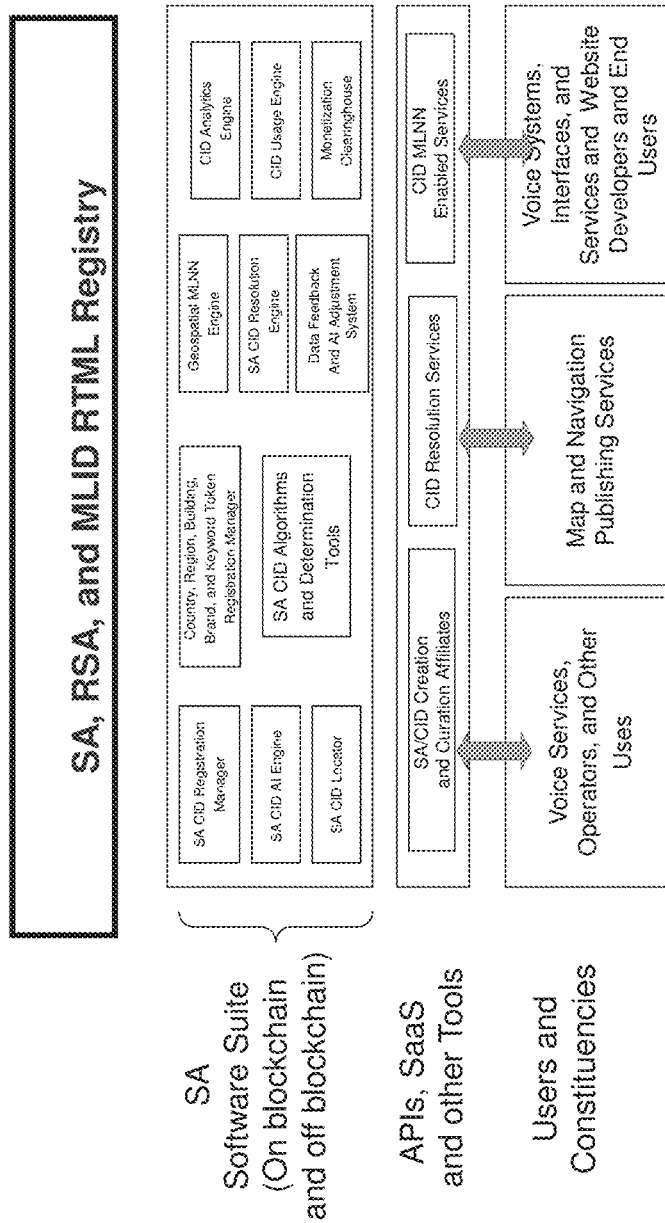
Figure 5A:
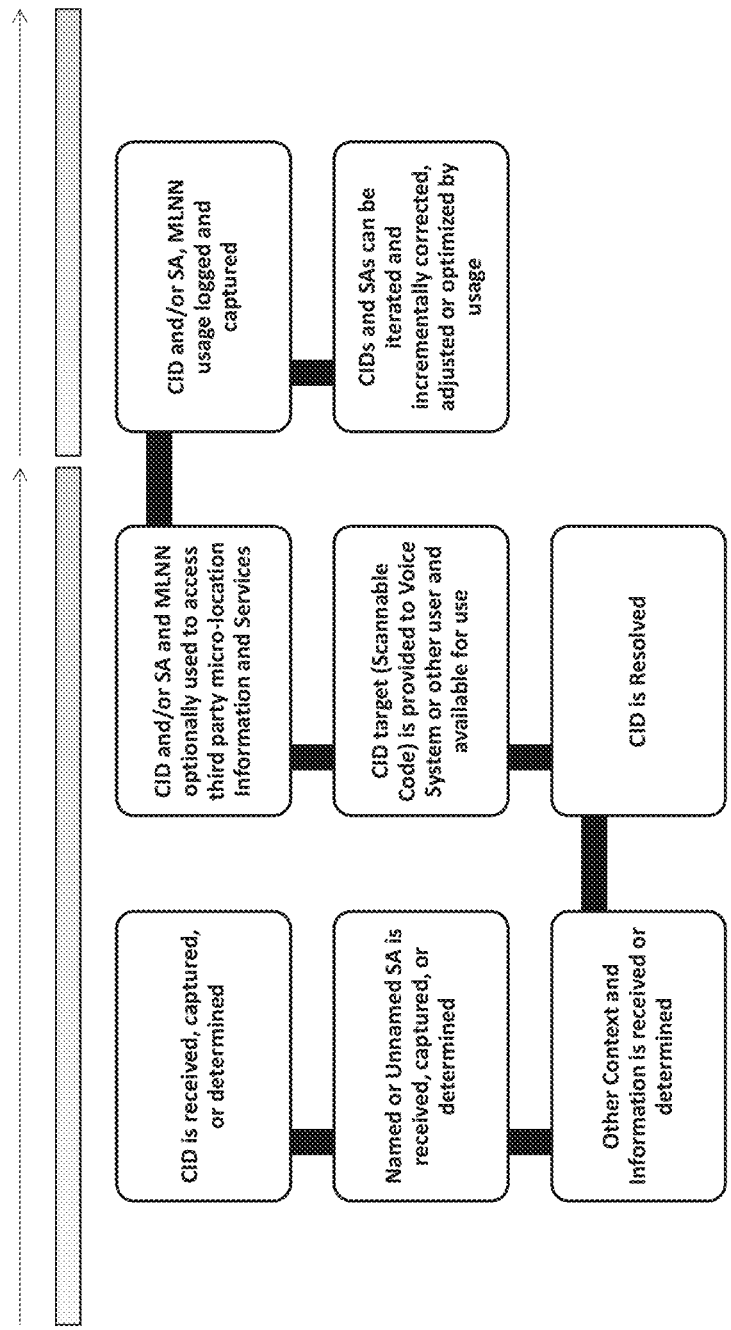
FIGS. 5A and 5B are schematics showing exemplary ordered steps in the process of determining, parsing, and resolving CIDs and MLNNs based on SAs and related contexts in accordance with the systems and methods herein.
Figure 5B:
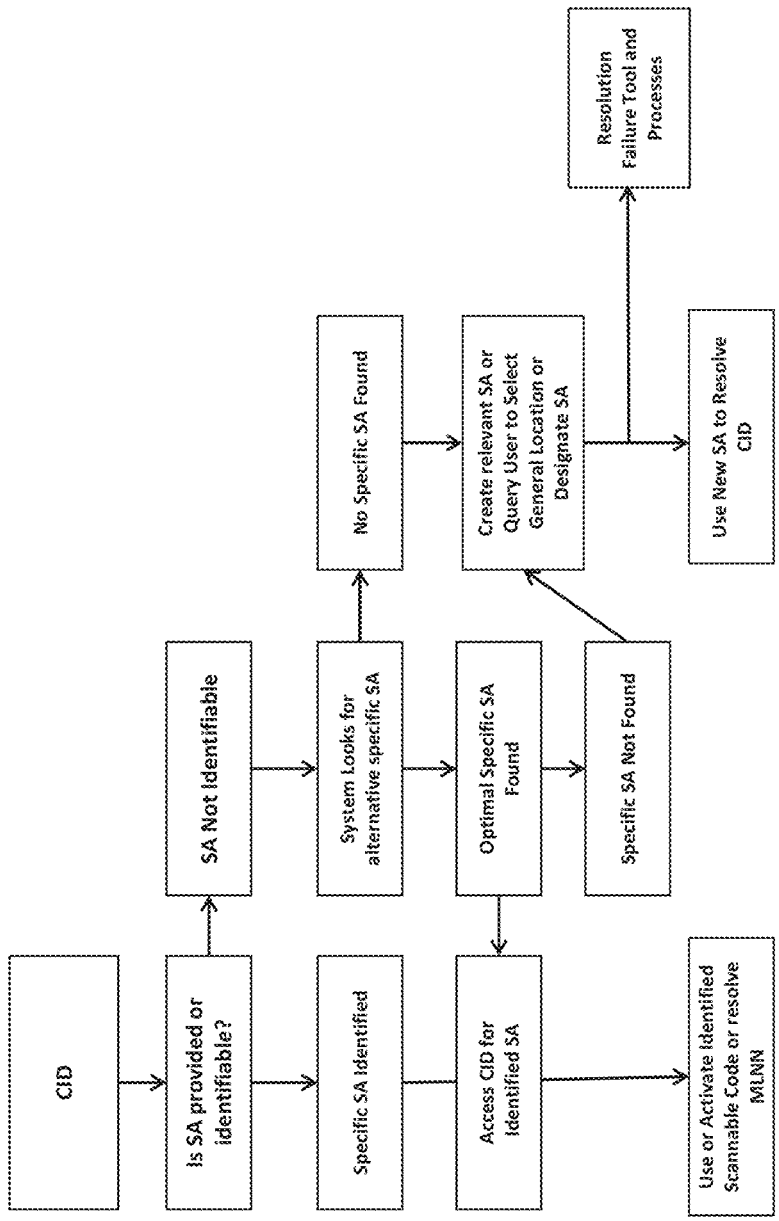
Figure 6:
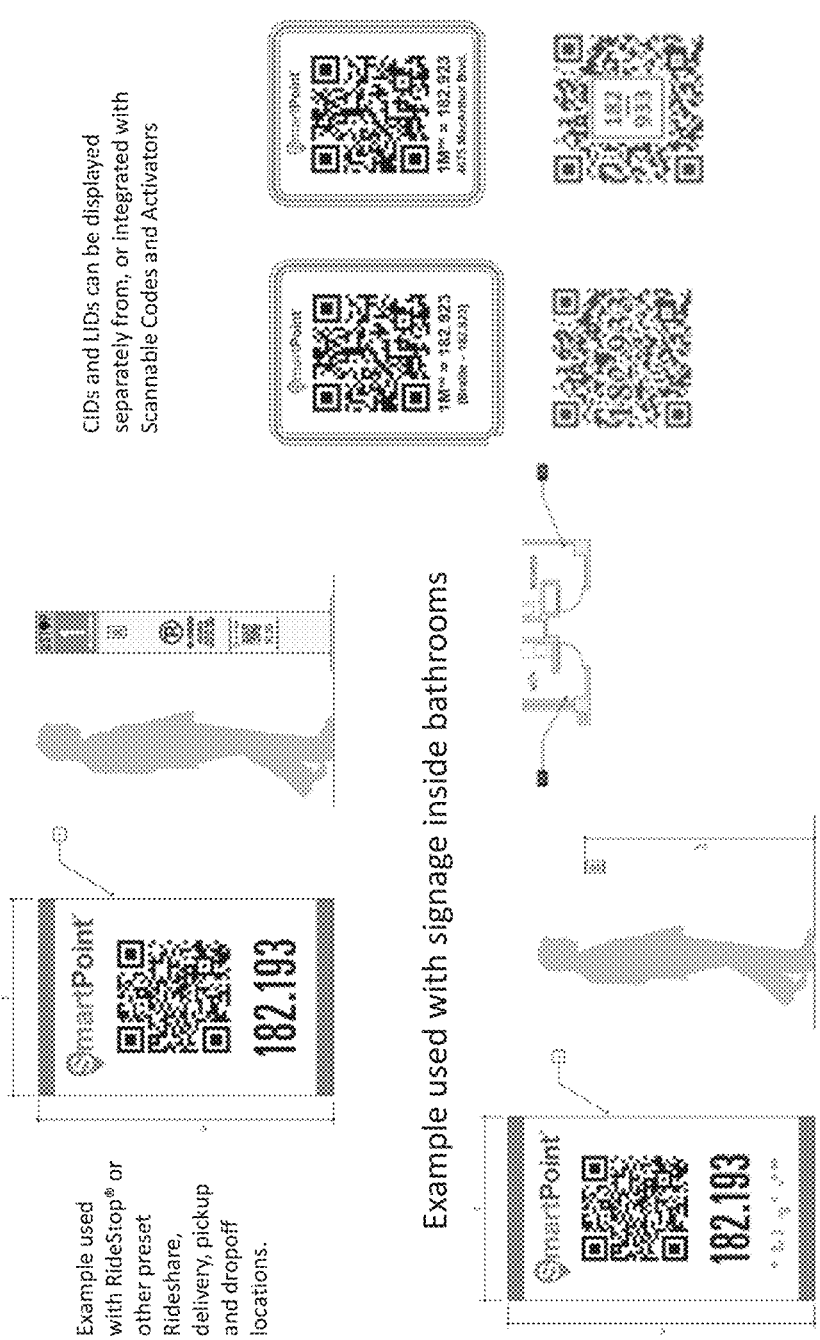
FIG. 6 shows exemplary locator signs including both Codes and voice enabled CIDs for rideshare, bathroom, and other signage and displays, including the addition of braille to enable CID use and access by visually impaired users.

SAs, CIDs and MLNN locators can also be integrated into micro-payment and affiliate revenue streams that incent the creation, ownership, and usage of SAs, display and provision of relevant CIDs and related information to users accessing such information through such CIDs, and provide payments to/from owner/creator/operators of such SAs, CIDs and Scannable Codes to/from end users or vendors can be adjusted from time to time based on the specific SAs, CIDs, MLNNs and other systems used and other variables. For example, as illustrated in FIGS. 4A and 4G, registration of SAs, CIDs, and Scannable Code can be represented by tokens or other ownership registry or recording systems, including blockchain, non-fungible tokens or other evidence or proof of ownership, usage, and control. Such registration can be independent and unrelated to other SAs, CIDs, or Scannable Codes, or the ownership and registration of such areas, identifiers, and codes can be dependent or group with other SAs, CIDs, or Codes in both structured (e.g. hierarchical) or unstructured groupings.

As illustrated in FIG. 11, MLNN locators, together with SAs can be used to synchronize disparate satellite and other images, street views, 2D and 3D digital twin interactive views, LIDAR, drone views, etc., together with floor plans, BIM, point cloud, LIDAR, AR, VR, and other visuals by using these MLNN and CID locators and systems and simple methods of ground truth, building truth, SA or other truth and then using the MLNN locator systems, to adjust and enhance these other images and resources, whether separately or more importantly, interoperable to enable better, faster, and more effective micro-location references, particularly with Voice Services over Voice Interfaces.

MLNNs can be used to provide discrete identifiers and access points to legacy ledgers and journals, cadasters, registries, etc. of properties, deeds, leases, casements, and other property rights, with owners of MLNNs controlling and/or monetizing access to such information, documents, agreements, landline or boundary agreements, and such ownership can be joint. For example, two or more parties might create the SA, CID, and MLNN identifiers and associated information relative to the SA and then agree that such information cannot be modified without the consent of two or more parties. Such a system could be used to aggregate and make publicly available real estate and other ownership, registration, transfer, lien, and other information for real and personal property easily accessible with the simple and short CID, including even intangible properties and assets. Such systems could be used to ensure that everyone has access to such information and/or to facilitate providing access to such information to such purchaser for commercial, legal, or other purposes. For example, such a system could be used to minimize the risk that someone might acquire rights to any such property without being on notice of any documents, thereby avoiding their claiming beneficial bona fide purchaser or other status.

Any and all Devices may be produced, shipped and delivered with discrete, short, highly visible CIDs preassigned, and/or such CIDs can be imbedded to be displayed or provided in any visual or audible display, which can be static or dynamic, variable, and programmable. CIDs can also be changed and controlled from remote locations by owners of SAs, or activated as such Devices enter an SA. For example, every voice access or visual display such as Alexa Echo Dots, Facebook Portals, Google/Nest Thermostats or Hubs, Ring doorbells, TVs and other equipment can have a unique and visible CID as illustrated in FIGS. 8A and 8B.

Because of the unique structure and systems used for the registration and use (including disambiguation) of the system, including location and other techniques, for example, determining the internet access point through any Network and other disambiguation techniques, it is possible for a short, easy to see, remember, input, and communicate 4 or 6 digit numeric CID to fill the needs of hundreds of millions of discrete Codes or Activators associated whether associated with locations, Devices, or not. Other alternatives can utilize various other characters (e.g., alpha) or discrete identifiers to provide virtually infinite permutations of CIDs that can be disambiguated by voice and other systems with a combination of client side and server side implementations of the systems and methods taught herein.

CIDs and MLNN locators can all be used for AR, VR, and other digital displays and systems for voice referencing of specific locations or triggering specific Activators. For gaming, multiple users of first-person shooter or other games could use these voiceable references to communicate with one or more other players precise locations within the game environment. In a AR or semi VR world, the CIDs or MLNNs could provide coordinated micro-location references to real-world maps, images, floor plans, schematics, etc. See, e.g., FIGS. 14, 15, and 26. For example, User 1 can communicate his or her exact location, or his or her intended destination, or the virtual location of one or more other players, objects, or participates by these short voice CID or MLNN references. These references could also be used for law enforcement or other systems to track participants and others on a real-time basis and to effectively communicate precise locations of targets, suspects, team members, or other devices or objects. In a pursuit scenario where the location may be changing, the relevant SAs and RSAs can be automatically adjusted based on the extent and nature of the relevant SA (e.g., a building or other structure, or a highway pursuit) to enable quick and efficient verbal communications with the system and all participants.

CIDs can be random or structured in a way to minimize conflicts. For example, the first two (or any two) digits of a six-digit code can be assigned based on geography such that the remaining four digits are unique withing any given SA. This may enable CIDs and MLNNs to be parsed, used for interval and computation of distance, areas, etc. to enable easier and faster distance and bearing calculations between CIDs and MLNNs, including the use of tables or other structured data sets to reduce CPU usage for organizing or manipulating big data related to or associated with locations and micro-locations. At the same time the structure and systems and methods are designed to work as one component of a global system and to facilitate work across all areas for scalability and efficacy.

As an example, one or more unique CIDs may be deployed for every hotel room in a hotel, and the CIDs can be assigned based on the room numbers, the location of the room relative to the hotel footprint or buildings, or they can be randomized for security purposes. This enables voice referencing with various levels of encryption or ambiguity. For example, in the Hotel Lobby one might say "Hey Siri, have the pizza delivered to 2102" instead of "Hey Siri, have the pizza delivered to Room 423" to ensure that no one nearby overheard the exact room number for safety, security, privacy, or other reasons. Thus, users could be provided cards at check in that provided both the room number and a unique, random CID, MLNN locator that they could use to discretely identify their room to authorized systems and persons without inadvertently disclosing it to others. Similarly, CIDs for Devices in each room can be correlated to each room, the hotel, the allocentric referencing system, or any other methodology. Guest occupying an expensive top floor might be provided information and help that is different than guests in the same hotel occupying first or second floor rooms by the pool. CIDs provide consistent, eventually familiar voice access to various content and services normally associated with Scannable Codes.

CIDs and MLNN locators can be used to identify desks, cubicles, tables, seats, devices, etc. for workspaces and in particular, hoteling and hybrid workspaces, expediting check ins and instantly informing team members of precise locations that may change from day today. Further, the CIDs and MLNN locators may be used to access information related to the specific location, SA, RSA or other relevant areas. CIDs provide an easy an effective way to communicate daily mission critical and other relevant, helpful, or otherwise appropriate information on an extremely granular level with speed, precision, and efficiency.

CIDs and MLNNs can be used to identify one or more digital 'chat rooms' or other group communications environments, enable communications to specific parties like buildings owners, operators, office personnel, concierge services, etc. And access to such environments or services can further be limited based on proximity to the location(s) identified by or related to the CID or MLNN. Similar systems can provide access to information about or related to such locations, services, Devices, etc., and the use of CIDs can effectively limit access to such services to persons who are withing visual range of the CIDs.

CIDs may be seen or heard through any method, including displayed or accessible separately from or with or integrated into any Scannable Code or Activator on or through any digital Device or displayed of through any sign, tag, label, designator, sticker, or pointer, token, or other visual display, heard through any type of audible sounds or broadcast, or through Braille or other tactile or touch communication methodology, including BCI (collectively, "CID Communications Methods").

Master and distributed, edge computing servers can be used to shorten the latency of remote servers, and the CIDs, MLNNs, and other identifiers and information and services related to such IDs will typically be served at the edge in distributed servers that are in close proximity to the CIDs and MLNN locators relative to any SAs that are near such servers and databases, which will be synchronized with master servers and the central database and repository.

The CIDs and MLNNs can be used to register, manage, maintain, curate and operate as a building-by-building digital twin registry (a "DT Registry") as master list of all permanent or temporary digital twin data or information, video, picture, BIM, LIDAR, or other imagery, IoT or other Devices and their precise location (2D, 3D, Room, etc.) owned and maintained by building owners, operators, occupants, or others. Such DT Registry can be arranged, organized, and optimized by SA, buildings, project, floor, tenant/occupant, person, etc. and CIDs and MLNNs designators can be used to help users identify, locate and manage such digital twins and related information and Devices.

The unique, short, and single string structure of CIDs and MLNNs enable Lucene and other text-based searches and other linear search methodologies, for GIS-like geo proximate searches with micro-location tools and widgets. Such text and linear searches and methods are superior to non-linear GIS data structures and search techniques typically based on pairs of latitude and longitude coordinates, customized bounded rectangles, etc. CIDs and MLNNs provide much faster, simpler, and effective access to micro-location services, information, and communications with normal off the shelf cell phone cameras, applications, mobile and online internet browsers, and other Devices for navigation and wayfinding as origin/starting, interim navigation, or destination points without the need for expensive Local and Indoor Positioning Systems (LPS) systems like ultrawide band, Bluetooth beacons, active and passive RFID/NFC tags, Wi-Fi positioning systems, etc. The use of CIDs, MLNNs, and MLNN locators has the further advantages of 1) being 100% opt in by end users, 2) nominal power needs for Devices from GPS, Bluetooth, or other active IPS solutions, 3) no requirement for users to download, find, or maintain an application and preset privacy and other permissions.

Finally, CIDs provide low cost yet perfect 100% room location accuracy because the underlying Scannable Code is assigned to the specific room, wall, device or other location. For example, voice services like Siri currently provide guidance to street addresses and buildings, but with short CIDs and MLNN locators users can communicate very precise locations for specific destinations. Further, upon reaching interim points along the route guidance, users can verbally communicate CIDs to communicate their current, interim locations (e.g., 3713 display near the elevator lobby on the 14th floor of a building) which enables Voice Services to then adjust directions without the necessity of intrusive phone location tracking to communicate the exact location of the users so the voice service can than provide further and more granular directions to the precise destination on the 14th floor.

Figure 27:
FIG. 27 shows an exemplary screen capture of an interactive display of a floor plan and 3D or other video tour of an office showing actual and virtual signs containing Codes and CIDs voice activating and referencing Codes and micro-locations and devices within such subject area of the office.
Figure 28:
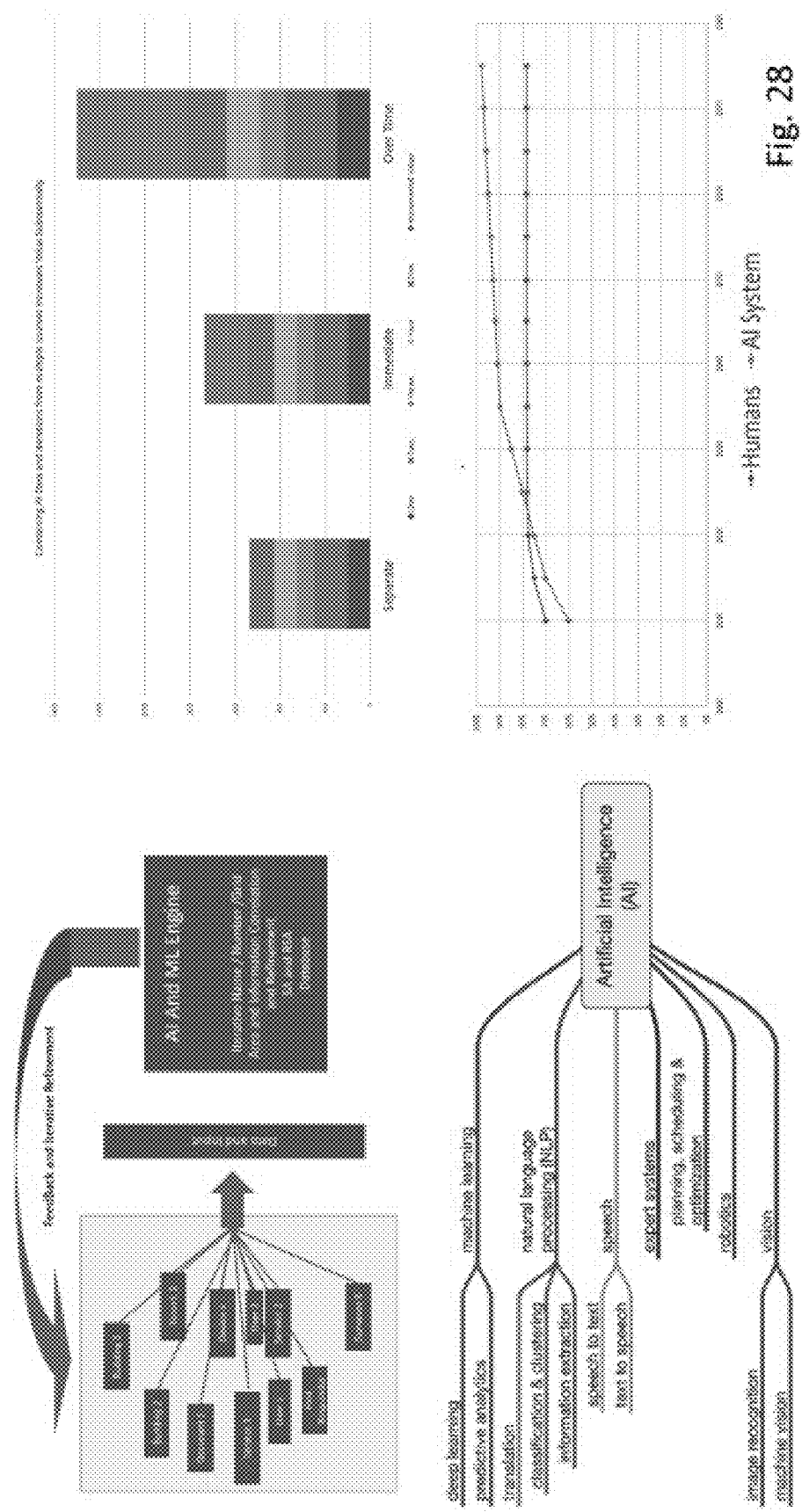
FIG. 28 shows various exemplary components of an AI and ML engine to capture and analyze usage of CIDs MLNNs, and SAs to improve and enhance the efficacy of CID, MLNN, and SA voice references and providing more curated, relevant and timely information.

Similarly, in a shopping mall with numerous levels, stores and locations, CIDs can be used to identify various in store destinations and access real-time specials and other information for the destination or other locations. For example, as illustrated in FIG. 27, CIDs can be displayed with Scannable Codes in building, elevator, and other lobbies as either destinations, starting, or interim points along a route. Further, the MLNN locator numbers can be used to identify and provide human or Device guidance to any location in the store. For example, the combination of CIDs and MLNNs can facilitate micro-navigation in large retail grocery and other stores to voice enable instant distance and bearing, or detailed turn by turn directions to or from any location. Thus, if a consumer drives to a shopping center to visit specific store A, the user can use the CID near one of the entrances to the mall to obtain more precise wayfinding to the destination. However, if the user is distracted on his/her journey and enters one or more stores in the mall, the users can use the CID for any specific store to obtain new and adjusted wayfinding instructions from that specific store or other origin.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. It will be appreciated that the various components and features described with the particular embodiments may be added, deleted, and/or substituted with the other embodiments, depending upon the intended use of the embodiments.

Further, in describing representative embodiments, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

I claim:

1. A method for enabling one or more users to identify and activate a scannable code using a shortcode identifier that is discrete within a subject area using an electronic device, comprising:
    enabling the user to view or hear the shortcode identifier displayed adjacent the scannable code; and
    enabling the user to communicate the shortcode identifier via the user interface of the electronic device whereupon the electronic device:
        identifies a general location of the electronic device;
        uses information related to the general location of the electronic device to resolve the shortcode identifier and identify the scannable code and a resolved location associated with the scannable code; and
        presents information to the user based on the resolved location and the scannable code on an output device of the electronic device.

2. The method of claim 1, where the shortcode identifier is displayed in a physical sign along with the scannable code.

3. The method of claim 1, where the shortcode identifier is displayed on the electronic display along with the scannable code.

4. The method of claim 1, where the electronic device transmits the shortcode identifier and the general location to a remote server to resolve the resolved location associated with the shortcode identifier within a geographic subject area including the location.

5. The method of claim 1, where the shortcode identifier identifies one of a specific room, door, window, stairwell, piece of equipment, or other micro-location place in or near a specific building within a geographic subject area.

6. The method of claim 5, wherein the electronic device uses information related to the general location by determining a geographic subject area based at least in part on an access point of a wireless network at the general location.

7. The method of claim 1, where the shortcode identifier comprises a virtual shortcode identifier displayed virtually on one of an augmented reality display, a virtual reality display, a HUD display, and a headset.

8. The method of claim 1, wherein enabling the user to view or hear the shortcode identifier comprises displaying a QR code to enable one of voice or text activation of the QR code.

9. The method of claim 1, wherein the alphanumeric shortcode identifier is an alphanumeric string having no more than six characters.

10. The method of claim 1, wherein the alphanumeric shortcode identifier is an alphanumeric string having fewer characters than the scannable code.

11. The method of claim 1, wherein the alphanumeric shortcode identifier is displayed under the scannable code.

12. A system for enabling a person or device to activate a scannable code by speaking or using one of one or more visual and displayed alphanumeric shortcode identifiers for such scannable code, comprising:
    a) a registry configured to:
        one of assigning or registering an alphanumeric shortcode identifier associated with a scannable code in a subject area, the alphanumeric shortcode identifier having fewer characters than the scannable code;
        verifying that the alphanumeric shortcode identifier is unique within the subject area;
        associating the alphanumeric shortcode identifier within that subject area to a specific scannable code;
        resolving the alphanumeric shortcode identifier within that subject area to the specific scannable code; and
    b) one or more processors configured to:
        enable a user to enter, input, speak, select, or communicate, using a user interface of an electronic device, the assigned or registered alphanumeric shortcode identifier displayed adjacent the specific scannable code;
        determine the subject area; and
        resolve and activate the scannable code assigned to the registered alphanumeric shortcode identifier.

13. The system of claim 12, wherein the subject area is a geographic subject area, and the one or more processors are configured to determine the scannable code with reference to the geographic subject area by at least one of: a) a predefined geographic subject area determined by reference to a two-dimensional area; b) a predefined geographic subject area determined by reference to a three-dimensional area and; c) a predefined two- or three-dimensional geographic subject area determined by reference to one or more of an existing real estate parcel, park, block, development, campus, combination of buildings, project, building, residence, apartment, room, or other structure or sub-structure, and d) one or more predefined nested or hierarchical geographic subject area determined by at least one of the foregoing.

14. The system of claim 12, wherein the one or more processors determine the geographic subject area based on at least one of a) a generalized name of the subject area, b) a placename, c) a street or postal address or d) general location information provided by a user or device on a use-by-use basis determined by one or both of an artificial intelligence and an algorithm using natural language and cognition processing.

15. The system of claim 12, wherein the one or more processors are configured to enable the user to input the scannable code identifier by the user based on at least one of text, voice, selection, and brain communication interfaces.

16. The system of claim 12, wherein the one or more processors are configured to use or include additional information, context, keyword search results, or services.

17. The system of claim 12, wherein the one or more processors are configured to disambiguate one or more of the one or more alphanumeric shortcode identifiers, the subject area, or the one or more processors select or determine the subject area by using information provided, known, or determinable by one of a sending or receiving electronic device or other contextual information to remote servers, including one of a) general coordinate location or other information related to the one or more of the micro-location identifiers or subject area, b) the identity of the user, and c) user and device generated contextual information related to one of the user, use, or general coordinate or other information related to the user or use.

18. The system of claim 17, wherein the alphanumeric shortcode identifiers are communicated by voice and the identity of the user is determined by biometric attributes determined by the voice of the user.

19. The system of claim 12, wherein the alphanumeric shortcode identifier is an alphanumeric string having no more than six characters.

* * * * *